United States Patent
Toyofuku

[19]

[11] Patent Number: 6,166,765
[45] Date of Patent: Dec. 26, 2000

[54] ELECTRONIC IMAGING APPARATUS SELECTING AN OPERATING MODE RESPONSIVE TO THE CONDITION OF A LENS BARRIER ASSEMBLY

[75] Inventor: Toshiyuki Toyofuku, Hachioji, Japan

[73] Assignee: Olympus Optical Co., Ltd., Tokyo, Japan

[21] Appl. No.: 08/907,798

[22] Filed: Aug. 8, 1997

[30] Foreign Application Priority Data

Aug. 12, 1996 [JP] Japan .................................. 8-212731

[51] Int. Cl.[7] ........................... H04N 5/225; H04N 5/222
[52] U.S. Cl. ........................................... 348/220; 348/333
[58] Field of Search .................................. 348/220, 231, 348/333, 335, 375, 241; 386/117; 396/296, 374, 448; H04N 5/232

[56] References Cited

U.S. PATENT DOCUMENTS 4,862,279 8/1989 Tsumazawa .............................. 348/375
5,828,986 10/1998 Horigome et al. ....................... 348/231

FOREIGN PATENT DOCUMENTS 406303496A 10/1994 Japan ............................. H04N 5/232

*Primary Examiner*—Wendy Garber
*Assistant Examiner*—Alicia Harrington
*Attorney, Agent, or Firm*—Volpe & Koenig, PC

[57] ABSTRACT

In an electronic still camera has a lens barrier, a mode switching instruction for switching a photography mode, in which an image signal representing an object image fetched by a photographic lens unit is output as a video signal by an image signal processing unit, and a reproduction mode, in which a reproduced signal processing unit is operated to supply the video signal to an LCD monitor, is issued on the basis of an output of a barrier switch to be turned on or off responsive to an opening or closing movement made by the lens barrier. Thus, a user-friendly electronic imaging apparatus enabling ready selection of the photography mode or reproduction mode can be provided.

4 Claims, 20 Drawing Sheets

ELECTRONIC IMAGING APPARATUS SELECTING AN OPERATING MODE RESPONSIVE TO THE CONDITION OF A LENS BARRIER ASSEMBLY

BACKGROUND OF THE INVENTION

1. Field of the Invention

The present invention relates to an electronic imaging apparatus having an imaging means and a reproduced signal processing means therein, and capable of switching a photography mode and reproduction mode so as to operate the imaging means or reproduced signal processing means.

2. Description of the Related Art

In a conventional electronic still camera having an imaging unit and image reproduction unit therein and capable of switching a photography mode and reproduction mode so as to operate the imaging unit or image reproduction unit, a mode selection switch for switching the modes is formed independently.

A user handles the mode selection switch to select the photography mode or reproduction mode, and thus designates whether an image to be displayed on an LCD monitor or the like is displayed as an image to be seen through a viewfinder or an image represented by image data stored internally is displayed.

However, in the conventional electronic still camera, the mode selection switch cannot be used in a natural manner in the course of handling the camera for photography or reproduction. A user is requested to handle the switch so as to express his/her intention of carrying out reproduction or photography. From this viewpoint, the camera is not user-friendly.

OBJECT AND SUMMARY OF THE INVENTION

The present invention attempts to resolve the above drawback. An object of the present invention is to provide a user-friendly electronic imaging apparatus enabling ready selection of a photography mode or reproduction mode.

An electronic imaging apparatus in accordance with the present invention has a mode switching means for switching a photography mode, in which an imaging means for photoelectrically converting an object image formed on the image plane of photographic lenses into an image signal is operated, and a reproduction mode, in which a reproduced signal processing means for supplying a video signal to a display is operated, and for thus operating the imaging means or reproduced signal processing means. Herein, a mode switching operation is interlocked with an opening or closing movement made by a lens barrier for covering the photographic lenses when the photographic lenses are unused.

In the electronic imaging apparatus, switching the photography mode and reproduction mode is interlocked with the opening and closing movement of the lens barrier.

Another electronic imaging apparatus in accordance with the present invention includes a mode switching means for switching an imaging mode, in which an imaging means for photoelectrically converting an object image formed on the image plane of photographic lenses into an image signal is operated, and a reproduction mode, in which a reproduced signal processing means for supplying a video signal to a display is operated, and for thus-operating the imaging means or reproduced signal processing means. The mode switching operation is carried out by a switching mechanism used to operate the display.

In the electronic imaging apparatus, the imaging mode and reproduction modes are switched by switching the switching mechanism.

The above as well as other features and advantages of the present invention will be fully apparent from the description below.

DESCRIPTION OF THE PREFERRED EMBODIMENT

An embodiment of the present invention will be described in conjunction with the drawings below.

Figure 1:
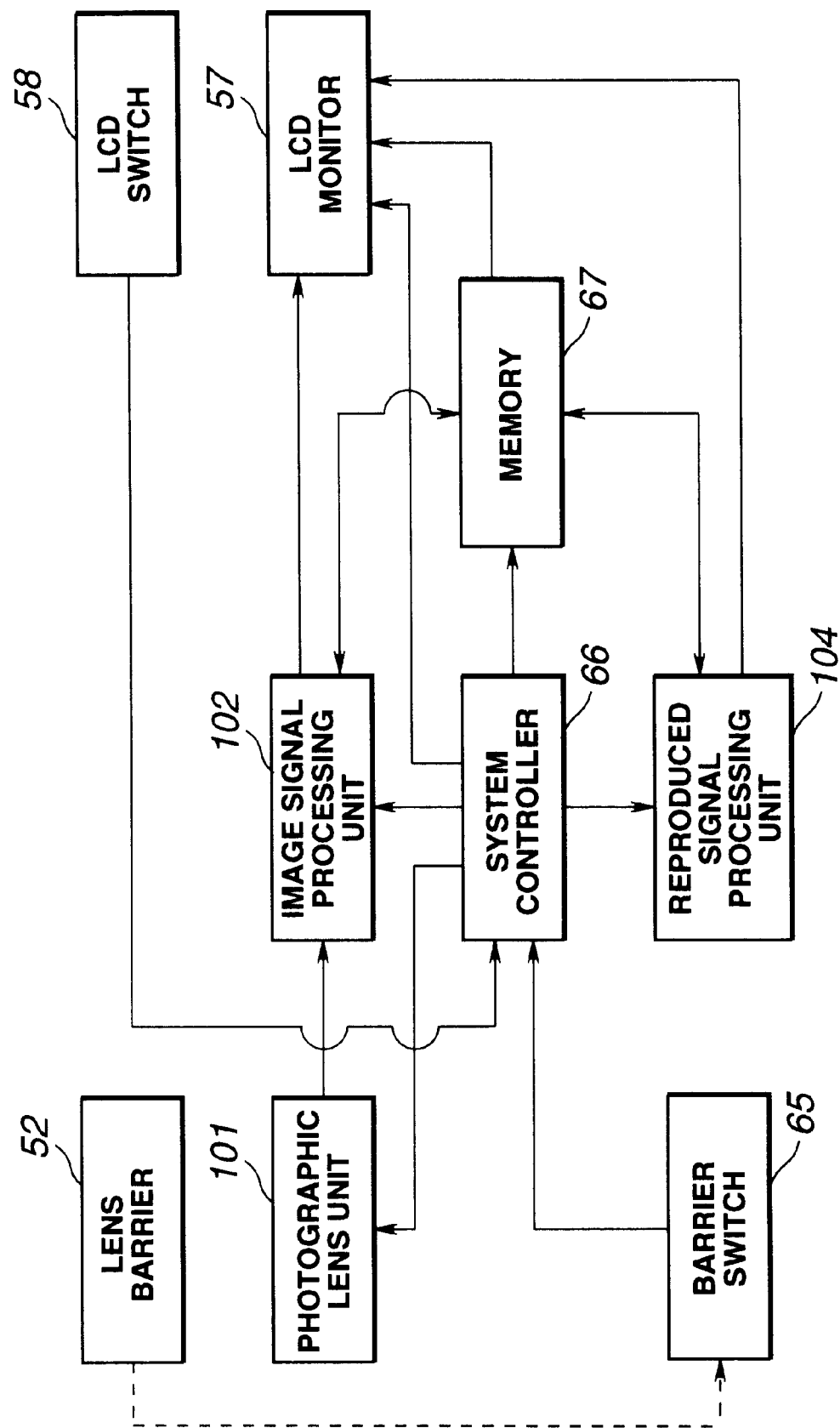
FIG. 1 is a block diagram showing the configuration of a major portion of an electronic still camera with a barrier which is an electronic imaging apparatus in accordance with an embodiment of the present invention.

FIG. 1 is a block diagram showing the configuration of a major portion of an electronic still camera 51 with a barrier which is an electronic imaging apparatus in accordance with an embodiment of the present invention.

The camera comprises a system controller 66 responsible for control of the entire camera; a photographic lens unit 101 in which photographic lenses, an imaging device, an automatic focus/aperture-narrowing device, a shutter, and the like are incorporated, and an image signal processing unit 102 for processing an image signal output from the imaging device, which constitute an imaging means; a memory 67 for storing image data output from the image signal processing unit 102; a reproduced signal processing unit 104 for reading image data from the memory 67 and outputting the image data to an LCD monitor 57 that is a display; the LCD monitor 57 for switching and displaying a through image output from the image signal processing unit 102 and a reproduced image represented by data stored in the memory 67; a lens barrier 52 capable of sliding between a closed position and open position at which the photographic lenses are closed and open; a barrier switch 65 to be turned on or off responsive to an opening or closing movement made by the barrier 52; and an LCD switch 58 that is a switching mechanism for switching display states of the LCD monitor 57.

In the camera, when the lens barrier 52 slides to an open position, the barrier switch 65 is turned on. An output signal of the barrier switch is input to the system controller 66, and the camera 51 is set to a photography mode. In the photography mode, an image signal representing an object image fetched by the photographic lens unit 101 is processed by the image signal processing unit 102. A through image represented by resultant image data is displayed on the LCD monitor 57. On the other hand, data of a projected image is stored in the memory 67.

When the lens barrier 52 slides to the closed position, the barrier switch 65 is turned off. The off-state signal is input to the system controller 66. Processing in the photography mode is then suspended. If the LCD switch 58 is on, the camera is set to the reproduction mode. In the reproduction mode, the data of a projected image stored in the memory 67 is read by the reproduced signal processing unit 104, and output to the LCD monitor 57 in order to display a reproduced image. The reproduction mode may be a processing mode in which image data produced by an external image processing apparatus is displayed on the LCD monitor 57.

An automatic focus control unit, automatic exposure control unit, shutter control unit incorporated in the system controller 66 control automatic focus drive to be performed on the photographic lenses, photometry, diaphragm drive, and shutter drive in the photographic lens unit 101. The details of processing operations to be carried out by the electronic still camera 51 with a barrier in the photography mode or reproduction mode will be described later in conjunction with the flowchart of FIG. 24.

Figure 2:
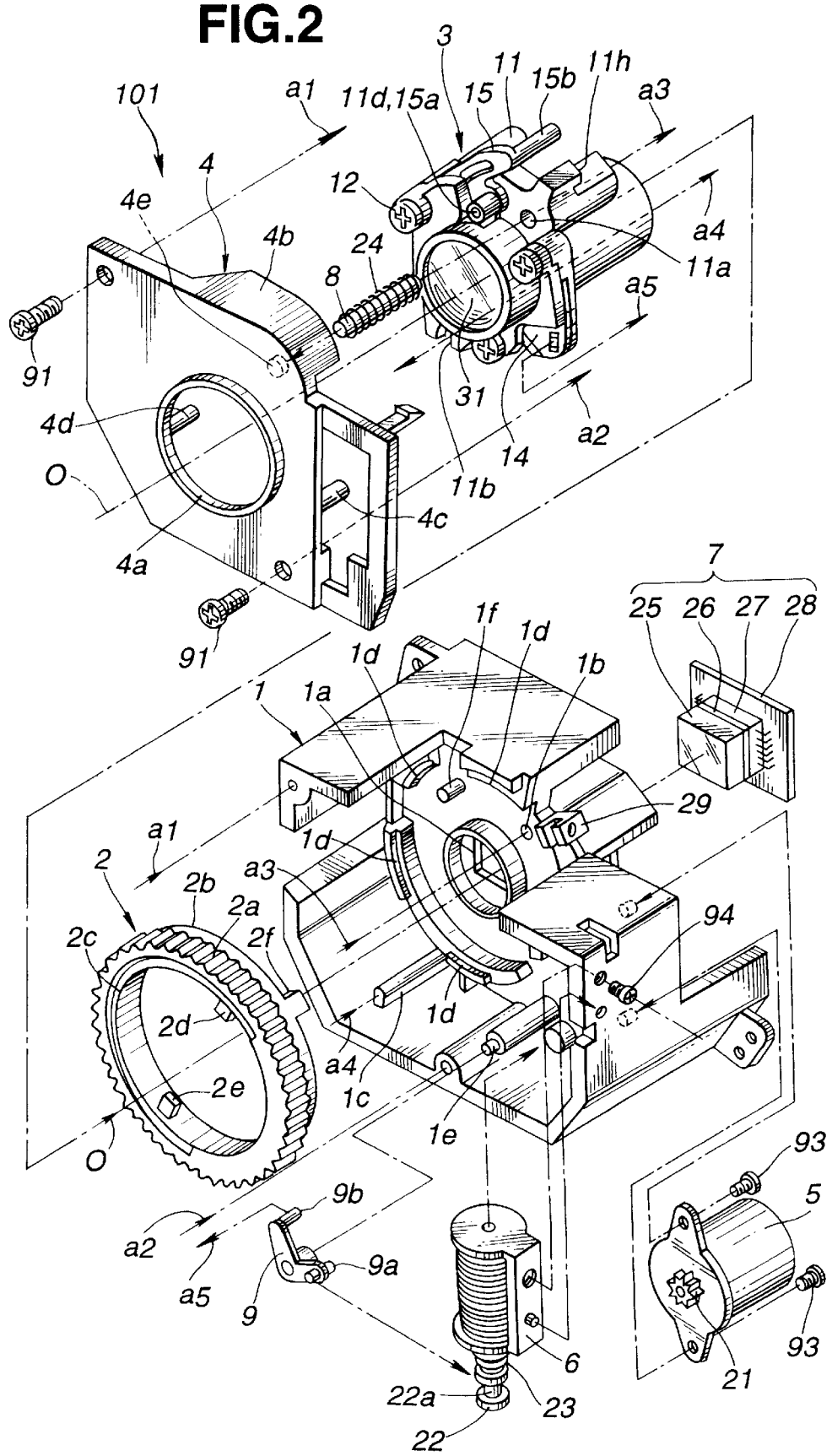
FIG. 2 is an exploded oblique view of a photographic lens unit incorporated in the camera shown in FIG. 1.
Figure 3:
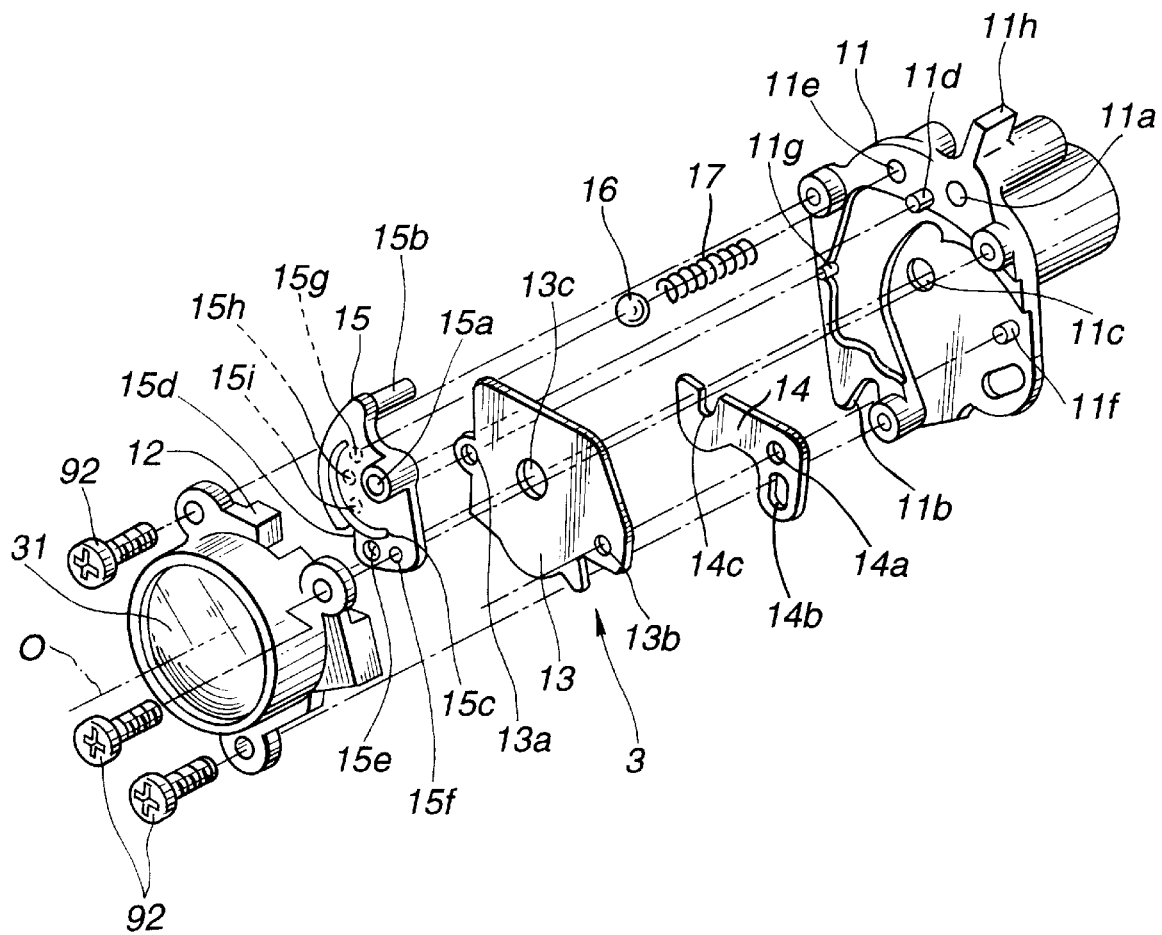
FIG. 3 is an exploded oblique view of a lens frame incorporated in the photographic lens unit shown in FIG. 2.

Next, the photographic lens unit 101 incorporated in the electronic still camera 51 with a barrier will be described in conjunction with the exploded oblique view of FIG. 2, and the exploded oblique view of FIG. 3 showing a lens frame incorporated in the photographic lens unit. In FIG. 2, a1 to a5 denotes junctions at which parts are connected.

The photographic lens unit 101 consists mainly of a main unit 1; a cam ring 2 that is attached freely rotatably to the main unit 1, and is a cam mechanism serving as a common driving mechanism having both the capabilities of a diaphragm driving mechanism and automatic focus driving mechanism; a lens frame 3, supported by the main unit 1 so that the lens frame can advance or withdraw freely along the optical axis O of photographic lenses, for holding the photographic lenses 31 and 32 (See FIG. 6); a suspension shaft 8, sheathed by a lens frame constraining spring 24 and locked in a support hole 1b of the main unit 1 and a support hole 4e of a cover 4, for guiding the lens frame 3 in the optical-axis direction; and a shutter driving lever 9, supported by a support pin 1e of the main unit 1 so that the shutter driving lever can pivot freely, for driving a shutter blade 14.

In addition, the photographic lens unit 101 comprises a CCD unit 7 fixed behind a photographic aperture 1a of the main unit 1, a photointerrupter 29 for detecting a rotational position on the cam ring 2 or a position on the cam ring 2 which has changed in angle with the rotation of the cam ring in cooperation with a shield plate 2f, the cover 4 fixed to the main unit 1 using attachment screws 91, a stepping motor 5 having a pinion 21 fixed to an output axis thereof and serving as a drive source for diaphragm drive and automatic focus drive, and an electromagnet 6 fixed to the main unit 1 using an attachment screw 94 and used to drive the shutter.

The cam ring 2 has a gear portion 2a capable of meshing with the pinion 21 on the outer circumference thereof, a cylindrical end surface 2b for supporting rotation, the shield plate 2f used to detect a rotational position, a cam portion 2c that is a cam formed on a cylindrical end surface and serves as an automatic focus driving mechanism for moving the lens frame 3 for automatic focus, and a diaphragm resetting projection 2d and diaphragm setting projection 2e which constitute a diaphragm driving mechanism capable of driving a diaphragm plate 15 by abutting on it.

Figure 4:
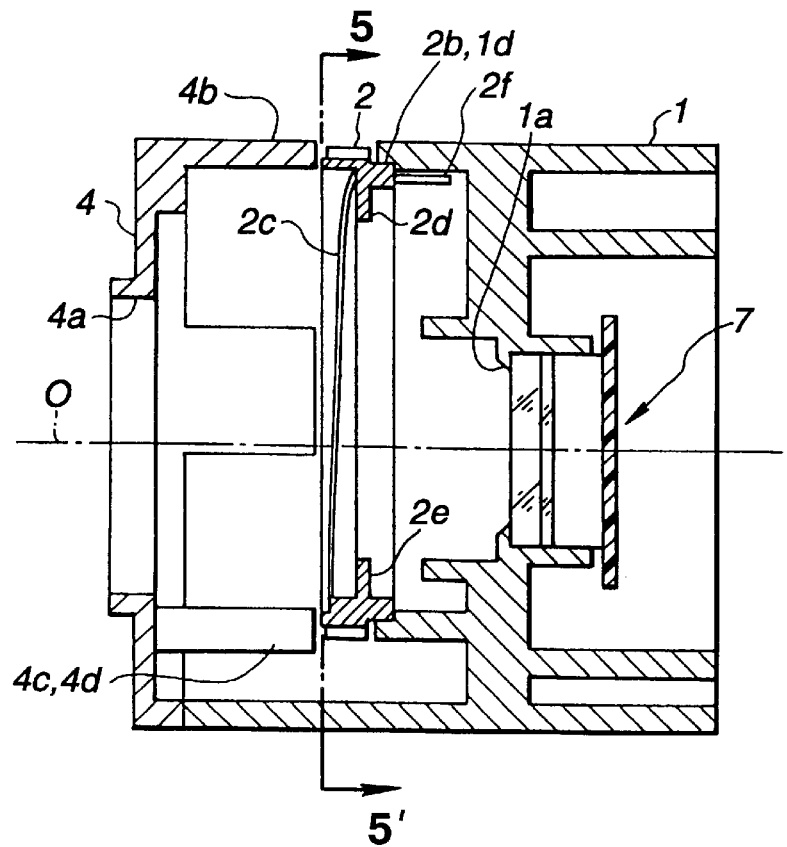
FIG. 4 is a longitudinal sectional view of a cam ring-mounted state of the photographic lens unit shown in FIG. 2.
Figure 5:
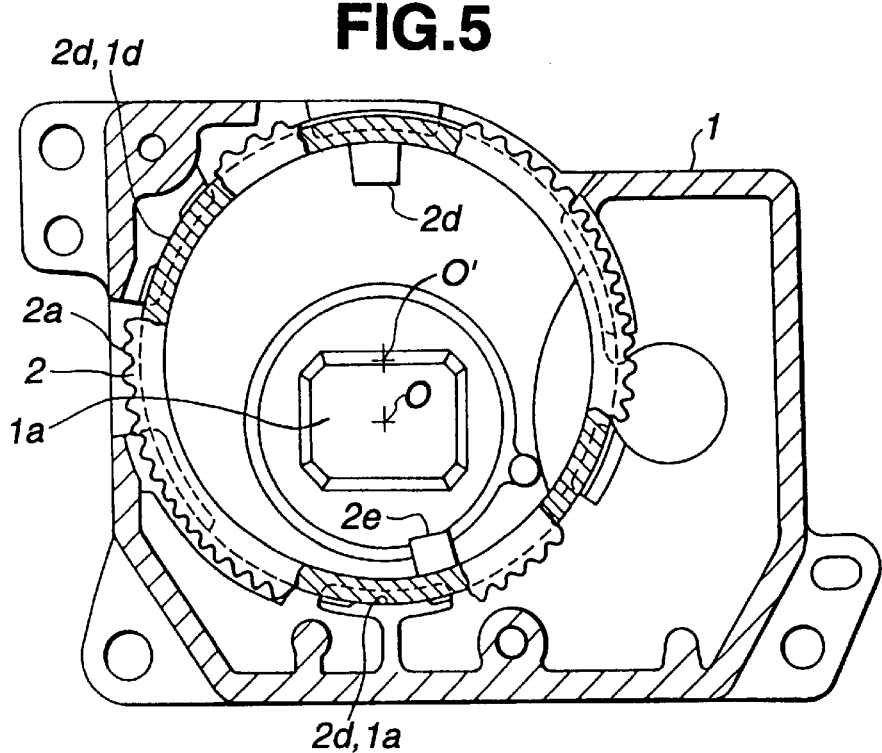
FIG. 5 is a 5–5' sectional view relevant to FIG. 4.

For mounting the cam ring 2 in the main unit, as shown in FIG. 4 that is the longitudinal sectional view showing a state in which the cam ring is mounted and FIG. 5 that is a 5–5' sectional view relevant to FIG. 4, when the cover 4 is fixed to the main unit 1 with the cylindrical end 2b inserted into circular guide ditches 1d of the main unit 1, the cam ring 2 is held freely rotatably with the movement of the end of the cam ring 2 in the axial direction restricted by juts 4b, 4c, and 4d of the cover 4. In this state, the pinion 21 of the stepping motor 5 meshes with the gear portion 2a, and the cam ring 2 is driven to rotate with the rotation of the motor 5.

Figure 12:
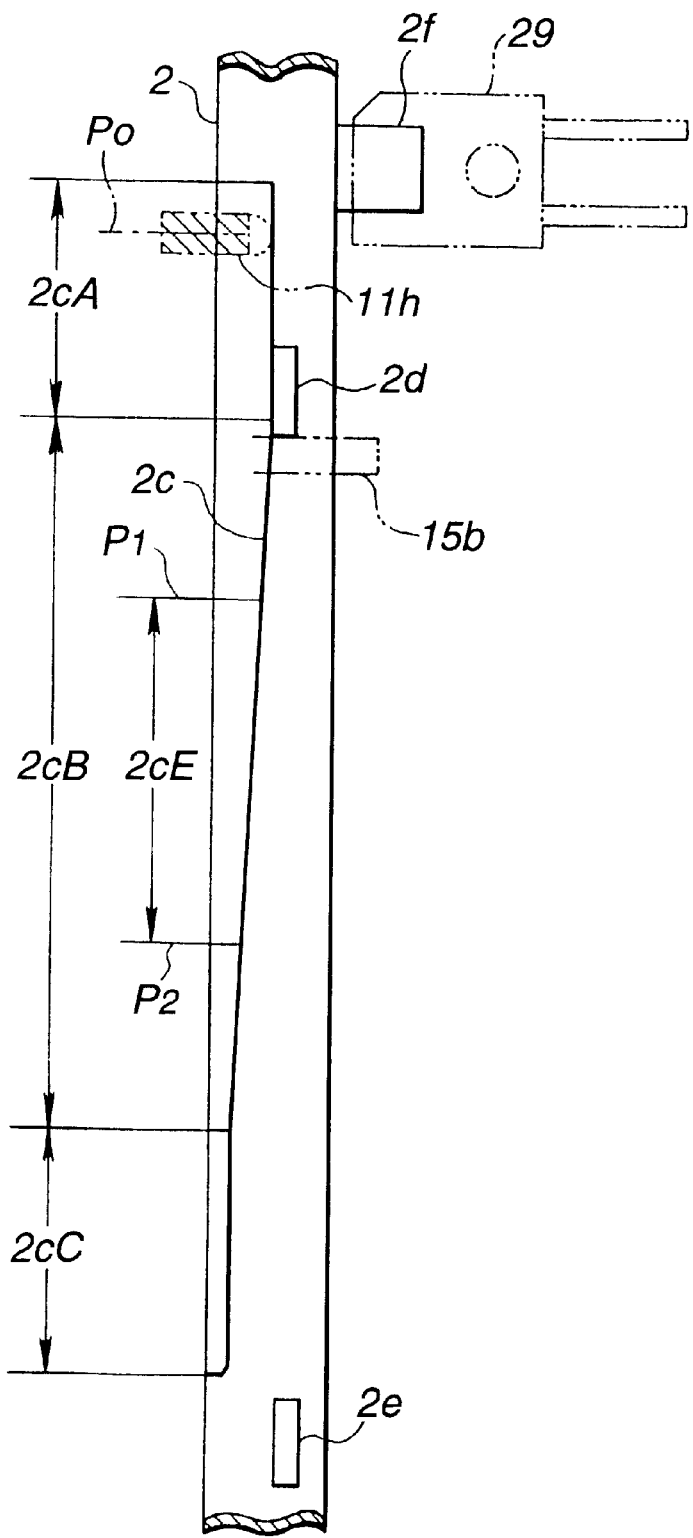
FIG. 12 shows the development of the cam ring of the photographic lens unit shown in FIG. 2.

The cam portion 2c has, as seen from the development shown in FIG. 12 which will be referenced later, a lens frame advancement/withdrawal area 2cB in the center thereof and diaphragm resetting area 2cA and diaphragm setting area 2cC, which are flat, at both ends thereof. A counter-cam portion 11h of the lens frame 3, which will be described later, abuts on and moves over the areas 2cA and 2cC with the rotation of the cam ring 2. When the counter-cam portion 11h lies in the diaphragm resetting area 2cA or diaphragm setting area 2cC, the resetting projection 2d or setting projection 2e presses the diaphragm plate 15. Thus, a diaphragm resetting or setting movement is made.

The lens frame 3 includes, as shown in the exploded oblique view of FIG. 3, a back frame 11 located near the imaging device, a front frame 12 located on an object side, the diaphragm plate 15 that is an element of a diaphragm mechanism interposed between the front frame 12 and back frame 11, the shutter blade 14 for opening or closing the photographic aperture 11c, a partition member 13 serving as a partition between the shutter blade 14 and diaphragm plate 15, having an opening 13c that determines the diameter of an open aperture, and being positioned by a pin 11g and a support pin 11f, and a ball constraining spring 17 inserted into a ball guide hole 11e of the back frame 1 and a diaphragm plate positioning ball 16.

Figure 6:
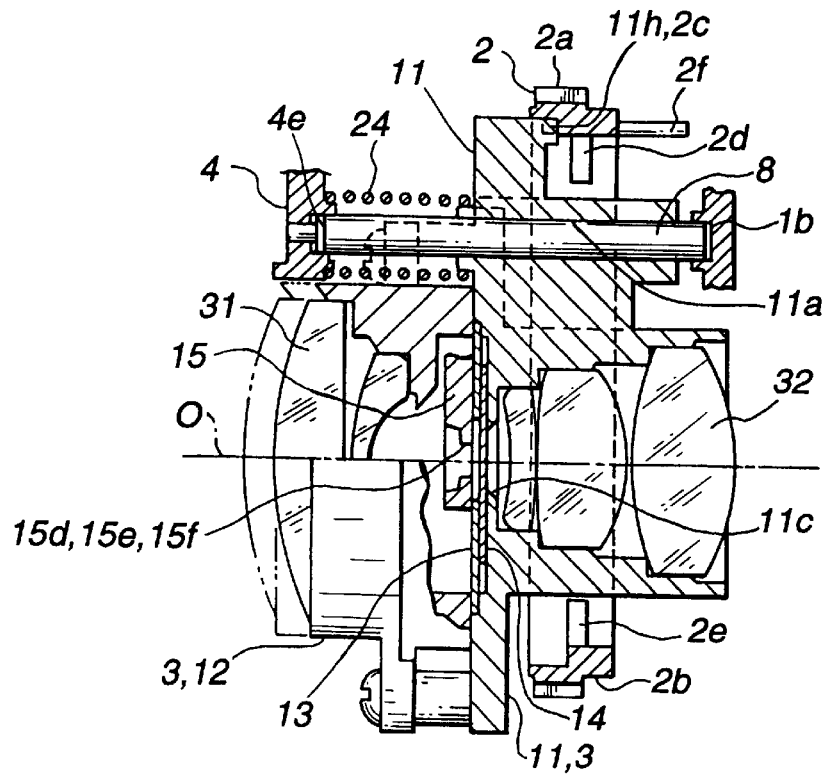
FIG. 6 is a longitudinal sectional view of the lens frame of the photographic lens unit shown in FIG. 2.

The back frame 11 holds the photographic lens 32, and includes a shaft hole 11a into which the suspension shaft 8 is fitted so that the suspension shaft 8 can slide freely, and a notch 11b in which a guide 1c of the main unit 1 is fitted. The back frame 11 further includes the counter-cam portion 11h (see, the longitudinal sectional view of FIG. 6 showing the lens frame) lying outside the shaft hole 11a, capable of abutting on the cam portion 2c of the cam ring, and serving as a driven part enabling automatic focus; the support pin 11f for supporting the shutter blade 14 so that the shutter blade can pivot freely, a photographic aperture 11c, and the ball guide hole 11e.

The front frame 12 holds the photographic lens 31, and is fixed to the back frame 11 with attachment screws 92 and is thus united with the back frame 11 to constitute the lens frame 3.

The diaphragm plate 15 is attached to the back frame 11 by matching an axis hole 15a with the support pin 11d so that the diaphragm plate 15 can pivot freely. The diaphragm plate 15 has a three-step turret structure where an open aperture portion 15d capable of being opposed to the photographic aperture 11c of the back frame 11 located in the center of the optical axis O, a medium stop 15e, and a little stop 15f are arranged along an arc equidistantly from the axis hole 15a. Moreover, an arched jut 15c is formed on a surface coming into contact with the front frame 12 in an attempt to reduce sliding resistance.

Moreover, the diaphragm plate 15 has counter-ball holes 15g, 15h, and 15i at positions at which the positioning ball 16 of the back frame 11 enters when the open aperture portion 15d, medium stop 15e, and little stop 15f become coincident with the photographic aperture 11c. The engagement of the positioning ball 16 to each hole gives clicking and holding force at each position. Furthermore, an abutment pin 15b that is an abutment member on which the projections 2d and 2e of the cam ring 2 can abut is formed to extend outward beyond the back frame. The abutment pin 15b has, as shown in the longitudinal sectional view of FIG. 7 showing the diaphragm plate and its surroundings of the lens frame 3, a given length permitting the projections 2d and 2e to abut on the abutment pin even when the lens frame 3 advances or withdraws.

When a zoom lens or the like is employed, the magnitude of advancement or withdrawal of the lens frame is large. In this case, as shown in FIG. 7, a cam ring 2' moves farther backward. An abutment pin 15b' of the diaphragm plate 15 is made longer. Thus, the mechanisms of the present invention can apply.

The shutter blade 14 has a V-shaped notched part 14c at a position coincident with the photographic aperture 11c, and an elongated hole 14b into which a driving pin 9b of the shutter driving lever 9 can be fitted. The shutter blade 14 is attached to the back frame 11 over the photographic aperture 11c by means of the support pin 11f of the back frame 11 so that the shutter blade 14 can pivot freely.

Figure 7:
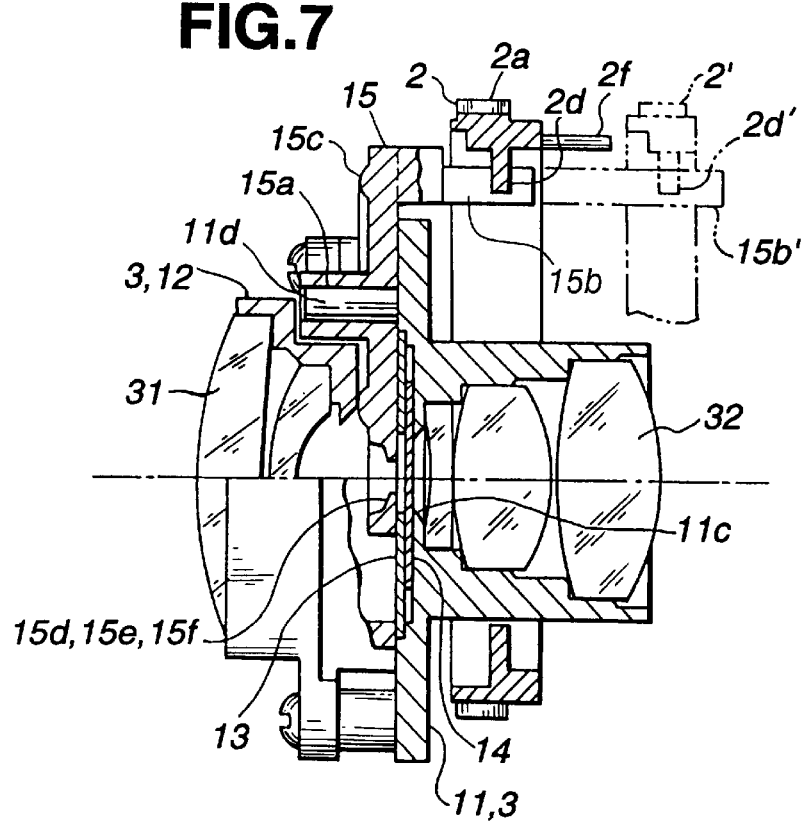
FIG. 7 is a longitudinal sectional view of a diaphragm plate and its surroundings in the lens frame of the photographic lens unit shown in FIG. 2.

The order of the diaphragm plate 15, partition member 13, and shutter blade 14 arranged in the optical-axis direction is, as shown in the longitudinal sectional view of FIG. 6 showing the lens frame or the longitudinal sectional view of FIG. 7 showing the diaphragm plate and its surroundings, such that the diaphragm plate 15, partition member 13, and shutter blade 14 are arranged in that order from the front frame 12 between the front frame 12 and back frame 11.

Figure 11:
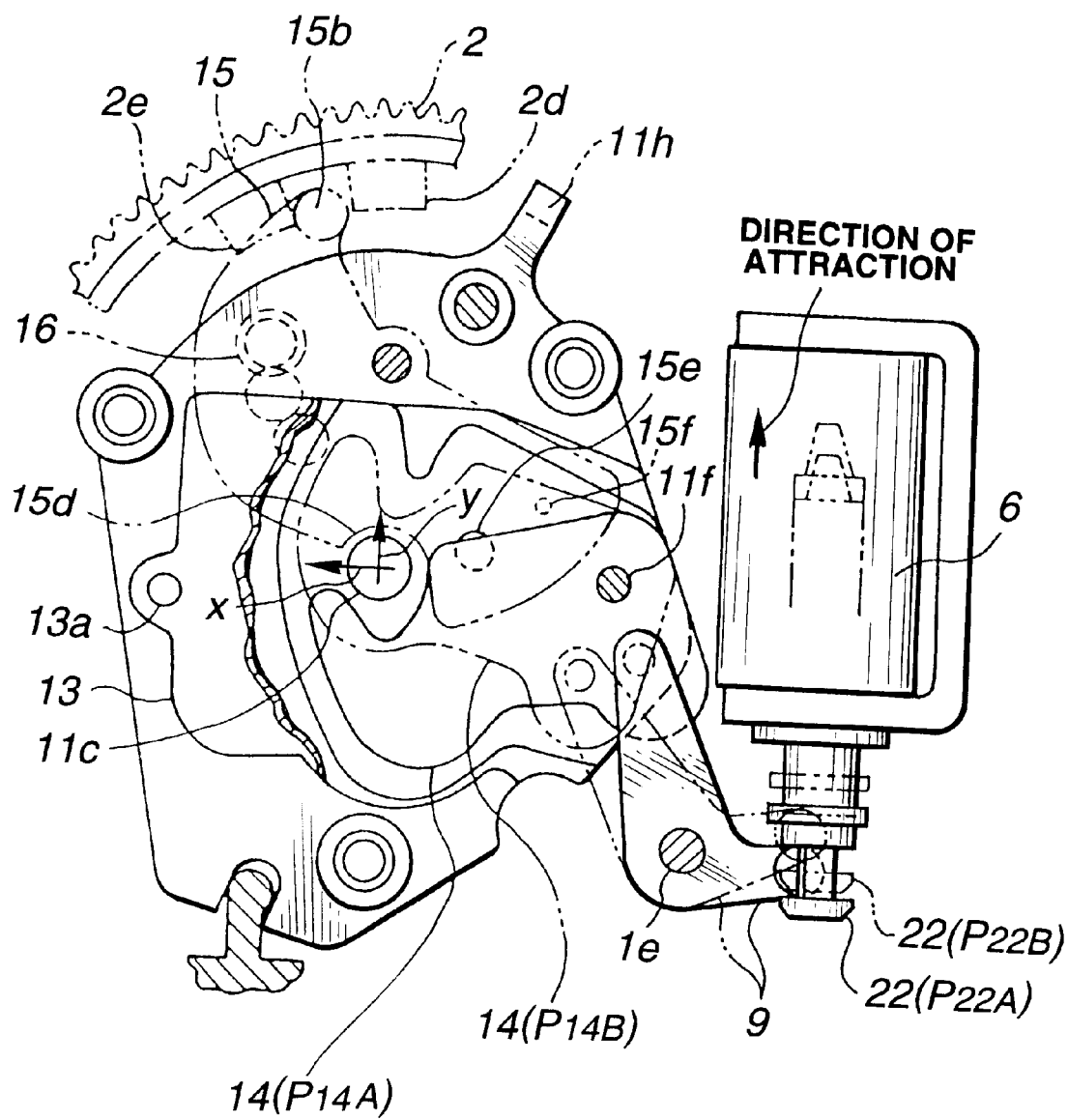
FIG. 11 is a sectional view showing the moved state of a shutter blade with the lens frame of the photographic lens unit shown in FIG. 2 seen from an object side.

The electromagnet 6 has a plunger 22 that is sheathed by a return spring 23 and that is a movable iron core capable of being thrust or attracted. The plunger 22 has a ditch 22a into which the driving pin 9a of the shutter driving lever 9 is fitted. As shown in FIG. 11 that will be referred to later, when the electromagnet 6 is turned off, the plunger 22 lies at a thrust position P22A or a position to which the plunger 22 is thrust. When the electromagnet 6 is turned off, the plunger 22 lies at an attracted position P22B or a position to which the plunger is attracted.

The CCD unit 7 is composed of an optical filter 25, a spacer 26, and a CCD 27 serving as an imaging device, and is united with a printed-circuit board 28.

Figure 8:
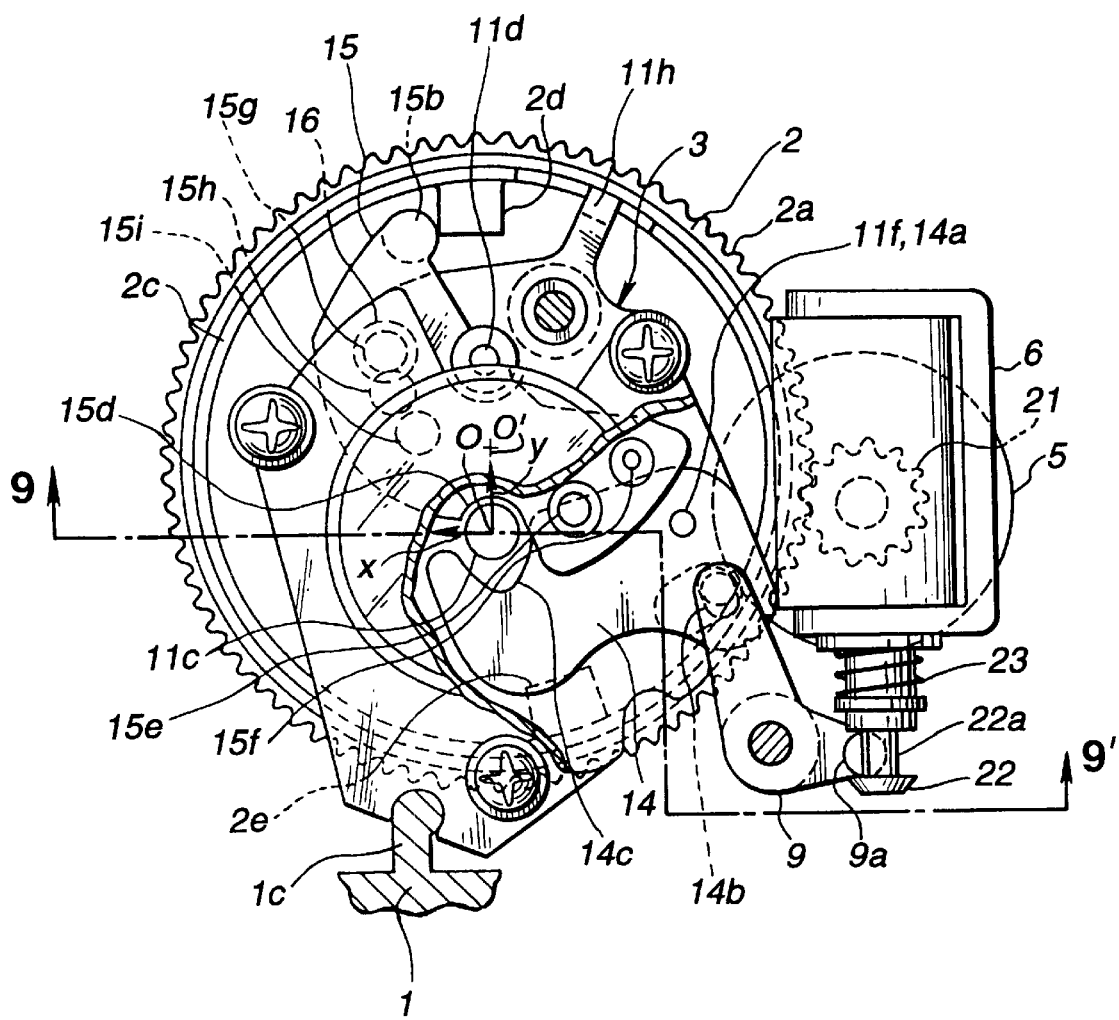
FIG. 8 is a sectional view showing the arrangement of members of an optical system including the diaphragm plate, and a driving source including an electromagnet and motor in the photographic lens unit shown in FIG. 2.
Figure 9:
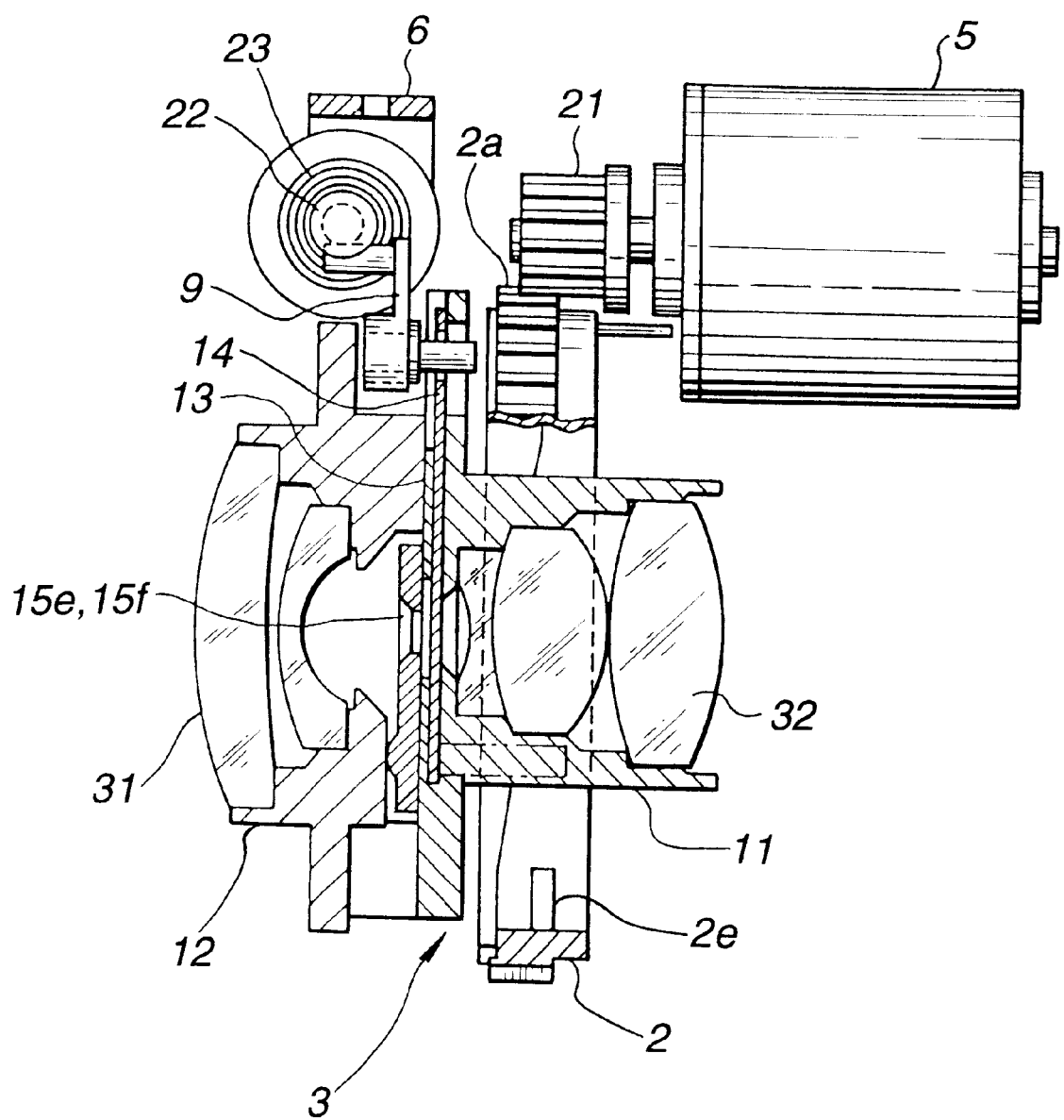
FIG. 9 is a 9–9' sectional view relevant to FIG. 8.

Next, the arrangement of the members of the optical system including the diaphragm plate and the driving members including the electromagnet will be described in conjunction with FIGS. 8 and 9. FIGS. 8 and 9 are diagrams showing states in which the diaphragm plate, shutter blade, electromagnet, and stepping motor are arranged. FIG. 8 is a sectional view showing the no components with the components seen from an object side along the optical axis, and FIG. 9 is a 9–9' sectional view relevant to FIG. 8.

As shown in FIG. 8, the position of the optical axis O in the lens frame 3 is eccentric to the center of rotation, O', of the cam ring 2. Owing to this eccentricity, the diaphragm plate 15 can be located near the center of the cam ring 2. Consequently, a structure where the abutment pin 15b used for rotation drive and located at an upper edge of the diaphragm plate 15 can be confined to the inside of the inner circumference of the cam ring 2 can be adopted. This makes it possible to design the cam ring 2 compactly.

The centers of rotation of the diaphragm plate 15 and shutter blade 11 (support pins 11d and 11f) are located at an upper position and right-hand position in directions (y-axis direction and x-axis direction) that are crossing at the photographic aperture 11c on the optical axis O. Since the centers of rotation are thus set, a direction in which the open aperture portion 15d and stops 15e and 15f are moved to be switched and a direction in which the notched part 14c for closing the aperture is moved are crossing at the optical axis O. An effect exerted by the setting will be described later.

The electromagnet 6 for driving the shutter blade and the stepping motor 5 for driving the cam ring are, as shown in FIG. 8, located on the right hand side of the lens frame 3 with the electromagnet and stepping motor seen from an object side. As for the arrangement in the direction of the optical axis O, as shown in FIG. 9, the electromagnet 6 is located on the flank of the front frame 12 of the lens frame 3, and the stepping motor 5 is located laterally to the back frame 11 of the lens frame 3 and extends backward in an image formation space. This arrangement is advantageous because the shutter blade 14 that is a load to be driven by the electromagnet 6 is located substantially in the center of the lens frame 3. Moreover, the arrangement is advantageous because the cam ring 2 that is a load to be driven by the stepping motor 5 is located laterally to the back frame 11. Furthermore, the arrangement is preferable from the viewpoint of the size of the motor.

Figure 10:
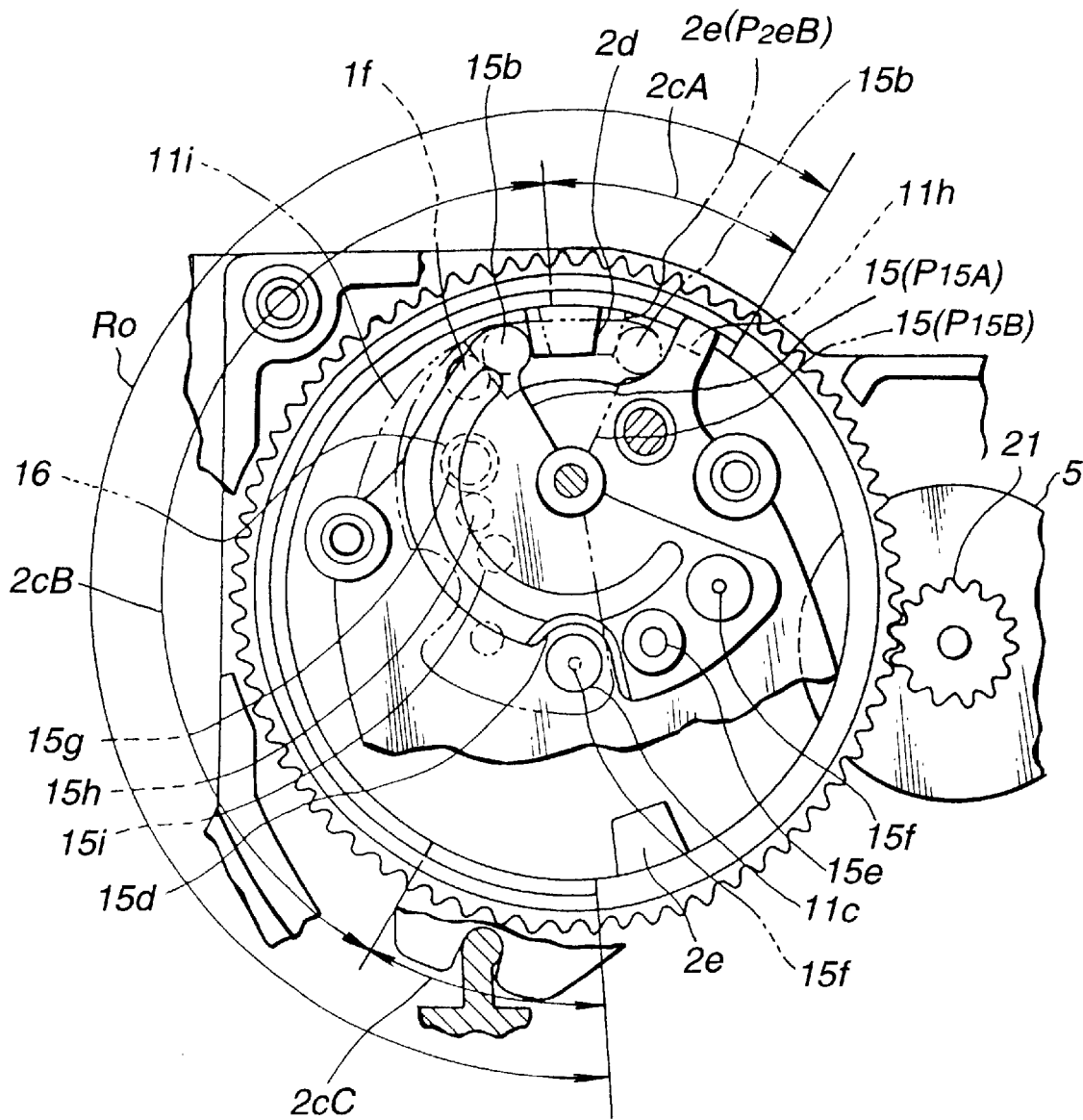
FIG. 10 is a sectional view showing the moved states of the diaphragm plate and cam ring with the lens frame of the photographic lens unit shown in FIG. 2 seen from an object side.
Figure 13:
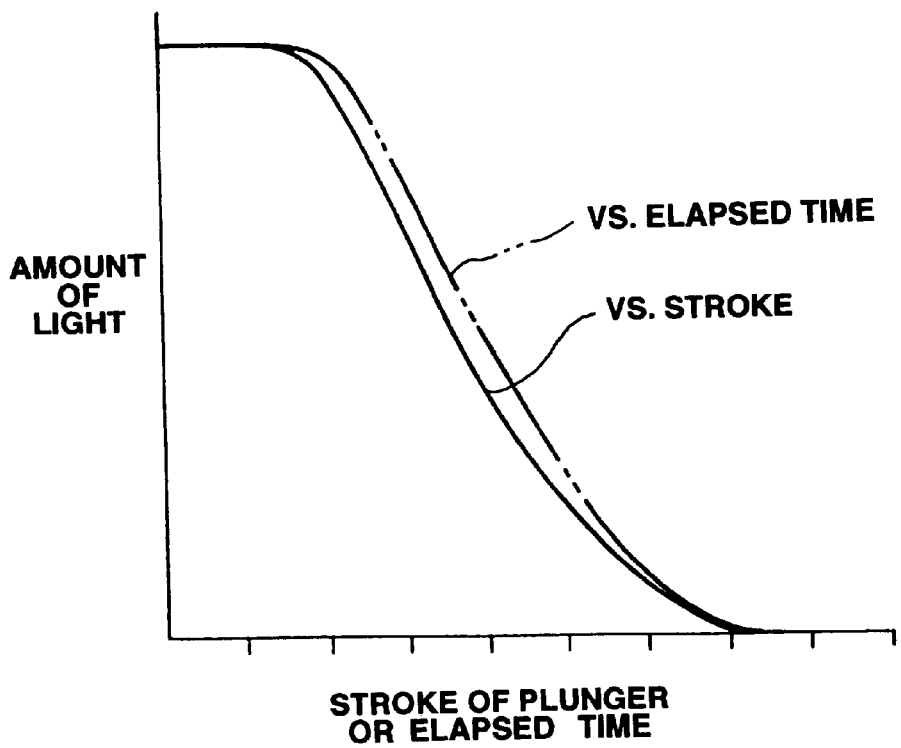
FIG. 13 is a graph showing a change in mount of light passed by a shutter in relation to the strokes of a plunger for an electromagnet in the photographic lens unit shown in FIG. 2, or to the elapsed times.
Figure 14:
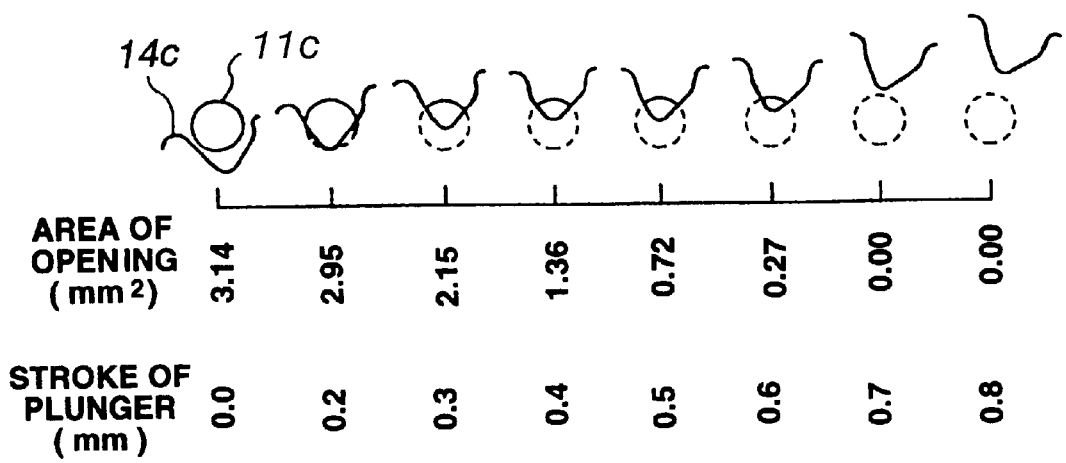
FIG. 14 is a diagram showing a change in area of the aperture hidden behind the shutter in relation to the strokes of the plunger for the electromagnet in the photographic lens unit shown in FIG. 2.

Next, a movement of opening or closing the diaphragm or shutter and a movement for automatic focus to be made in the photographic lens unit 101 having the foregoing components will be described in conjunction with FIGS. 10 to 14. FIG. 10 is a sectional view showing the moved states of the diaphragm plate and cam ring with the lens frame seen from an object side, and FIG. 11 is a sectional view showing the moved state of the shutter blade with the lens frame seen from the object side. FIG. 12 shows the development of the cam ring. FIG. 13 is a graph showing a change in amount of light passed by the shutter in relation to the strokes of the plunger or times, and FIG. 14 is a diagram showing the values of the area of the aperture hidden behind the shutter and the shapes of the aperture in relation to the stokes of the plunger.

To begin with, movements to be made by the lens frame and diaphragm responsive to the rotation of the cam ring 2 will be described. The cam ring 2 has, as shown in FIG. 12, the cam portion 2c composed of the advancement/withdrawal area 2cB whose height varies in the direction of the optical axis O, and the diaphragm resetting area 2cA and diaphragm setting area 2cC which are flat. When the cam ring is driven to rotate by the stepping motor 5, the counter-cam portion 11h of the lens frame 3 (See FIGS. 3 and 8) slides within a rotational range R0 on the cam portion 2c.

When the counter-cam portion 11h reaches the area 2cA within the range R0, a diaphragm resetting movement is made as described later, and the diaphragm is reset with the counter-cam portion located at a position P0. The arrival of the counter-cam portion at the position P0 is sensed by detecting the shield plate 2f using the photointerrupter 29 (See FIG. 12). When the counter-cam portion moves within a given range from the position P0, and slides in the advancement/withdrawal area 2cB, the lens frame 3 advances or withdraws along the suspension shaft 8 against the constraining spring 24. An automatic focus movement is made, that is, automatic focus is carried out. The magnitude of the movement in the advancement/withdrawal area 2cB is set to be large enough to absorb an error produced during manufacturing of the lenses in the lens frame. During actual assembling and adjustment, part of the area 2cB, for example, an area 2cE (between rotational positions P2 and P1 or positions on the cam ring of which angles are changed with the rotation of the cam ring) is selected as a focusing area used to focus the lenses on positions ranging from a very near position to an infinite position. When the counter-cam portion 11h reaches the area 2cC, a diaphragm setting movement that will be described later is made.

For making the diaphragm resetting movement, the cam ring 2 is rotated counterclockwise. When the counter-cam portion 11h reaches the area 2cA, the projection 2d of the cam ring 2 causes the abutment pin 15b of the diaphragm plate 15 to rotate counterclockwise. When the counter-cam portion 11h reaches the position P0, the diaphragm plate 15 has rotated to a reset position P15A shown in FIG. 10 or a position at which the diaphragm is reset. The open aperture portion 15d coincides with the photographic aperture 11f of the lens frame 3, whereby a full open state is attained.

At this time, the positioning ball 16 engages with the counter-ball hole 15g of the diaphragm plate 15. The diaphragm plate 15 is held at the reset position P15A by a given clicking force. Owing to the clicking force, even when the projection 2d of the cam ring 2 is separated from the abutment pin 15b of the diaphragm plate 15 during a succeeding automatic focus movement, the diaphragm is retained in the reset state.

Furthermore, when the diaphragm is retained in the reset state, the abutment pin 15b is sandwiched between the resetting projection 2d and a projection 1f of the main unit 1 serving as a holding mechanism. In this state, even when the camera is no longer used and the power supply is turned off, the cam ring 2 is held owing to a cogging torque exerted by the stepping motor 5. The diaphragm plate 15 is therefore retained at the reset position P15A. Even if vibrations or an impact works on the camera that is unused, the diaphragm plate 15 is retained at the reset position. Displacement can be prevented, and the start of subsequent photography will not be hindered. Moreover, the members of the optical system can be prevented from being broken during transportation or the like.

Incidentally, the projection if of the main unit 1 serving as a holding mechanism may be formed on the lens frame 3. For example, a stopper 11i (See FIG. 10) may be formed on the back frame 11 in order to retain the diaphragm plate 15 at the reset position.

Moreover, for making a diaphragm setting movement, the cam ring 2 is temporarily rotated clockwise from a diaphragm reset state in which the counter-cam portion 11h is located at the position P0 until the counter-cam portion 11h comes to the diaphragm setting area 2cC. However, when photography is carried out with the diaphragm retained in a full open state, the cam ring need not be rotated until the counter-cam portion comes to the diaphragm setting area 2cC. Advancement/withdrawal drive is carried out with the counter-cam portion located in the lens frame advancement/withdrawal area 2cB.

When diaphragm setting is setting the diaphragm to a medium open state, the cam ring is rotated until the counter-cam portion 11h comes to the area 2cC. After the setting projection 2e abuts on the abutment pin 15b of the diaphragm plate 15, the cam ring is further rotated clockwise. When the medium stop 15e coincides with the photographic aperture 11c of the lens frame 3, the rotation of the cam ring 2 is stopped. In this state, since the positioning ball 16 engages with the counter-ball hole 15h, the diaphragm plate 15 is held by a given clicking force and set to the medium open state.

When diaphragm setting is setting the diaphragm to a little open state, the cam ring is rotated until the counter-cam portion 11h comes to the area 2cC. After the setting projection 2e abuts on the abutment pin 15b of the diaphragm plate 15, the cam ring is further rotated clockwise. When the little stop 15f coincides with the photographic opening 11c of the lens frame 3, the rotation of the cam ring 2 is stopped. In this state, the diaphragm plate 15 is located at a rotational position P15B in FIG. 10 or a position to which the diaphragm plate is rotated. The positioning ball 16 engages with the counter-ball hole 15i, the diaphragm plate 15 is held by the given clicking force and set to the little open state.

After diaphragm setting is completed, the cam ring 2 is rotated counterclockwise. When the counter-cam portion 11*h* lies in the area 2*c*E (between the rotational positions P2 and P1) of the cam ring 2 inside the area 2*c*B within an automatic focus movement range, a movement of focusing the photographic lenses is made. Photography is then carried out at a proper f-number in an in-focus state.

After photography is completed, the cam ring 2 is further rotated counterclockwise. The resetting projection 2*d* presses the abutment pin 15*b* of the diaphragm plate 15. The diaphragm plate 15 is returned to the rotational position P15A in FIG. 10 which is a reset position.

As mentioned above, the photographic lens unit 101 is requested to advance or withdraw the lens frame 3 for focusing or set the diaphragm plate 15 to a rotational position by rotating the cam ring 2. For, making an automatic focus movement, for example, after an exposure value is determined, an f-number is set. If a diaphragm driving range is set within the automatic focus movement range on the cam portion 2*c* of the cam ring 2, there arises a drawback that the diaphragm is displaced during an automatic focus movement.

The cam ring 2 is, as mentioned above, designed to work independently for driving the lens frame for advancement or withdrawal and for driving the diaphragm. That is to say, the cam ring 2 is designed so that the diaphragm resetting and setting projections 2*d* and 2*e* work within a range outside the lens frame advancement/withdrawal drive range 2*c*B that is an affective range for driving the lens frame on the cam portion 2*c*. Thus, aperture narrowing is carried out accurately, and a mechanism for driving the diaphragm can be positioned readily. Since the cam ring 2 is provided with both an automatic focus driving mechanism and diaphragm driving mechanism, an adjustment process and parts can be simplified.

Furthermore, the cam ring 2 is shaped like a ring and designed so that the cam portion formed on a cylindrical end surface is used to drive the lens frame 3 for advancement or withdrawal. An increase in thickness in the optical-axis direction can be suppressed. Moreover, the cam ring 2 is mounted on the lens frame in the photographic lens unit, and the optical members including the lens frame, which will be described later, are stowed in the inside of the cam ring 2. There are therefore few jutting parts. This realizes a compact design of the photographic lens unit itself and contributes to the improvement of the efficiency in stowing the members. Moreover, since the cam portion is located inside, it can be avoided that dust or the like adheres to the cam surface. Deterioration of performance in automatic focus drive can be avoided.

Next, a shutter opening/closing movement responsive to the on-off operation of the electromagnet 6 will be described.

When the plunger 22 of the electromagnet 6 is located at the thrust position P22A, the shutter blade 14 is, as shown in FIG. 11, located at an open position P14A at which the notched part 14 has withdrawn from the photographic aperture 11*c*. When the plunger 22 is attracted to lie at the attracted position P22B, the shutter blade 14 is driven clockwise via the shutter driving lever 9 and moved to a closed position P14B at which the photographic aperture 11*c* is closed.

After photography is completed, when the electromagnet 6 is turned off, the plunger 22 is returned to the thrust position P22A due to the constraining force of the return spring 23. The shutter blade 14 is also returned to the open position P14A at which the photographic aperture 11*c* is open.

As mentioned previously, the direction (x-axis direction) in which the open aperture portion 15*d* and stops 15*e* and 15*f* of the diaphragm plate 15 are moved to be switched and the direction (y-axis direction) in which the notched part 14*c* of the shutter blade 14 is moved are crossing at the optical axis O. By adopting this arrangement, deterioration of the accuracy in time during which the shutter opens the aperture (shutter speed in seconds) is resolved.

For example, when a stop is displaced in the y-axis direction in which the notched part is moved, after the electromagnet 6 is turned off, the time required for the notched part 14*c* to pass through the stop, that is, the shutter speed changes. This leads to deteriorated accuracy.

High accuracy can be guaranteed for the distances in the y-axis direction of the stops 15*e* and 15*f* of the diaphragm plate 15 from the axial center because the accuracy is dominated by the accuracy of a single part.

By contrast, a position at which the diaphragm plate is held after being clicked in the x-axis direction in which the stops are moved may be deviated slightly because of the compound influence of the accuracy in position of the positioning ball 16 held in the back frame 11 and the accuracy in position of the stops of the diaphragm plate 15.

In the photographic lens unit of the present invention, the accuracy in position in the y-axis direction of the stop 15*e* or 15*f* of the diaphragm plate 15 is so excellent that deterioration of the accuracy in shutter speed deriving from attraction of the plunger 22 can be avoided. Moreover, the accuracy in positioning the stop 15*e* or 15*f* in the x-axis direction in which the stops are moved to be switched is, as mentioned above, not very high. However, only a little displacement occurs in the direction orthogonal to the direction in which the notched part 14*c* of the shutter blade 14 is moved. This hardly affects the shutter speed.

Instead of the structure where the direction in which the stops 15*e* and 15*f* of the diaphragm plate are moved and the direction in which the notched part 14*c* of the shutter blade is moved are mutually orthogonal, a structure where the direction in which the stops 15*e* and 15*f* of the diaphragm plate are moved and the direction in which the notched part 14*c* of the shutter blade is moved are not mutually orthogonal but the same with each other may be adopted as a shutter mechanism. In this case, deterioration of the accuracy in positioning a stop in the direction in which the stop is moved leads to deterioration of the accuracy in shutter speed.

The shutter blade 14 has, as mentioned previously, the V-shaped notched part 14*c* as a portion for closing the photographic aperture 11*c*. The characteristic of a change in amount of light passing through the notched part 14*c* will be described in conjunction with FIGS. 13 and 14. FIG. 13 is a graph showing a change in amount of light passed by the shutter blade in relation to the strokes of the plunger 22 or elapsed times, and FIG. 14 is a diagram showing a change in area of the aperture in relation to the stokes of the plunger 22.

As shown in FIG. 14, in an early stage of a closing movement, the aperture 11c is blocked while being laterally hidden behind the two sides of the notched part 14*c* which are inclined in the form of letter V.

Figure 26:
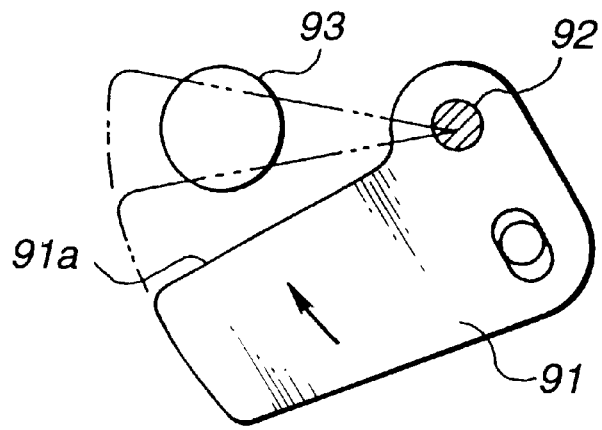
FIG. 26 is a diagram showing the structure of a shutter blade, which is a straight blade, in a conventional photographic lens unit.

In the case of a conventional straight shutter blade shown in FIG. 26, a shutter blade 91 that can pivot with respect to a support axis 92 is designed to close an aperture 93 by hiding it behind a straight blade part 91*a*. As seen from the graph of FIG. 27 showing a change in amount of light passing through the conventional shutter blade, the change in amount of light in relation to the strokes of a plunger is linear.

By the way, when the electromagnet 6 is turned on to start attraction, normally, a speed at which the plunger is attracted changes in such a manner that the speed is low in an early stage of drive because of the inertia of the plunger or frictional force and then gets gradually higher.

Figure 27:
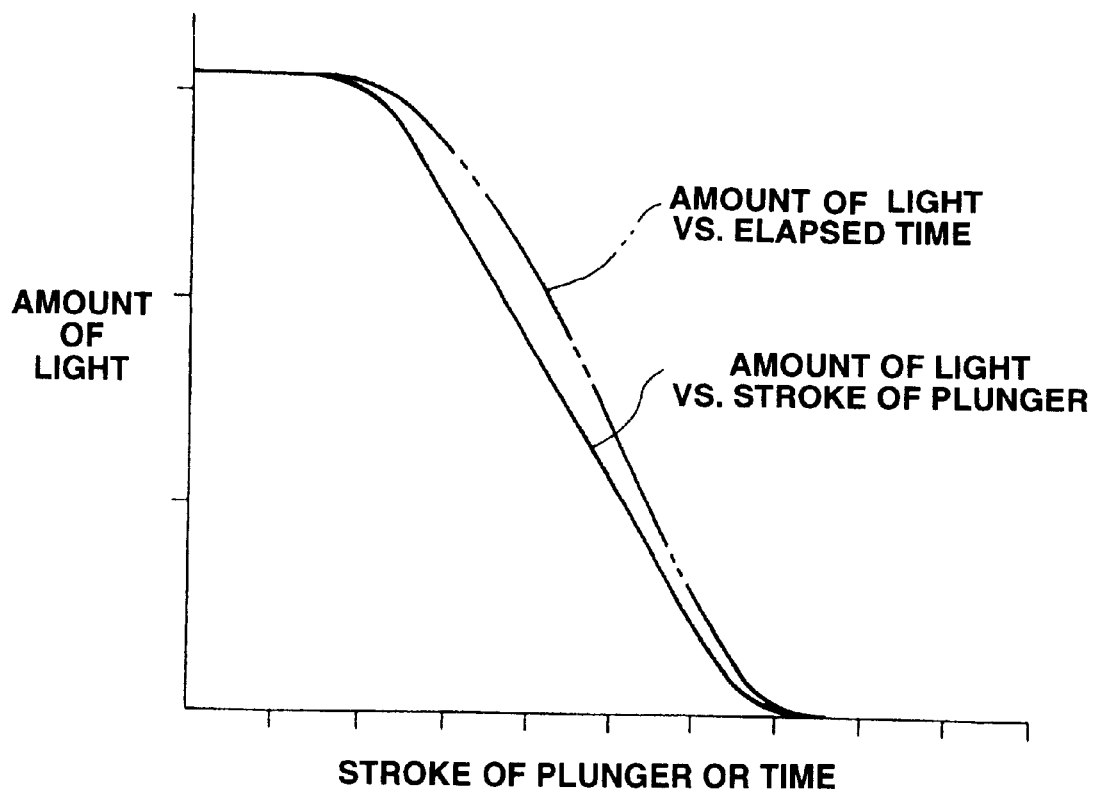
FIG. 27 is a graph showing a change in amount of light passed by the conventional shutter blade in relation to the strokes of a plunger for an electromagnet or times.

The change in amount of light passed by the conventional shutter blade 91 in relation to elapsed times is, as shown in FIG. 27, slow on an early stage on which a short time has elapsed. Thus, the change in amount of light is slow initially and starts to get faster on an intermediate stage. The elapsed time required until the amount of light is halved can be regarded as the shutter speed. Even if the time required until the conventional shutter blade closes the aperture is the same as the time required until the shutter blade of the present invention does, since the initial change in amount of light is slow, an apparent shutter speed is lower.

According to the shutter blade 14 of the photographic lens unit of this embodiment, as described in conjunction with FIG. 14, since the aperture is closed using the V-shaped notched part, a rate at which the area of the aperture is reduced by an initial movement is high and a rate at which the amount of light is reduced is high. Consequently, even if a movement of attracting the plunger 22 is slow initially, the amount of light can be reduced linearly in relation to the elapsed time as shown in FIG. 13. The apparent shutter speed can be made higher.

Now, a series of photographic operations to be carried out when the photographic lens unit 101 is incorporated in an automatic focus camera will be described. First, when a release switch is pressed to the first step thereof, exposure value detection is carried out. After an in-focus position of the lens frame is detected by making an automatic focus movement, it is awaited that the release switch is pressed to the second step thereof. When the release switch is pressed to the second step, the cam ring 2 is rotated clockwise. This causes the counter-cam portion to pass from the diaphragm resetting position through the lens frame driving range within which automatic focus is carried out. The cam ring 2 is further rotated until the counter-cam portion comes to a diaphragm setting position, for example, a medium open position so that the diaphragm can be set according to the result of exposure value detection. Thereafter, the cam ring 2 is rotated counterclockwise in order that the lens frame 3 is driven to an in-focus position, which is detected by pressing the release switch to the first step thereof, via the counter-cam portion 11h thereof. Photography is then carried out.

An angle of rotation of the cam ring 2 is controlled by the number of driving pulses to be applied to the stepping motor 5. However, when consideration must be taken into a backlash of the gear portion 2a or the like, before the lens frame 3 is set to the in-focus position, the cam ring 2 is temporarily rotated counterclockwise by several steps so that the lens frame 3 goes beyond the in-focus position. Thereafter, the cam ring 2 is rotated clockwise so that the lens frame is located at the already-detected in-focus position. By driving the cam ring 2 this way, high-precision automatic focus can be achieved.

After photography is completed, the cam ring 2 is rotated counterclockwise. This causes the counter-cam portion 11h of the lens frame to return to, as shown in FIG. 12, the full open state or the reset state, that is, the position P0 on the cam portion 2c.

As mentioned above, in the photographic lens unit 101, when photography is completed, the diaphragm is reset to the full open state. An in-focus position detecting movement that is part of an automatic focus movement can be started immediately after the start of subsequent photography. The time required for preparations can be shortened, and maneuverability improves. Moreover, since the automatic focus movement is made in the full open state all the time, the depths of the photographic lenses may be small, and high-precision data can be obtained by carrying out photometry.

Next, a variant of the photographic lens unit 101 shown in the development in FIG. 12 in terms of the cam ring 2 will be described. As already described, the cam ring 2 is designed to rotate not only for driving the lens frame for advancement or withdrawal but also for driving the diaphragm to a set or reset position. Rotated positions in the areas 2cA and 2cC on the cam portion at which diaphragm setting and resetting movements are made are located at both ends of the cam portion and considerably separated from the rotational range of the effective advancement/withdrawal area 2cE defined as part of the area 2cB that is the lens frame advancement/withdrawal area.

During the series of photographic operations, after the cam ring 2 is rotated for moving the counter-cam portion from the diaphragm resetting position to the lens frame advancement/withdrawal area, photometry is carried out. Thereafter, the counter-cam portion is moved to the diaphragm setting position at an end on the cam portion, and then returned to the lens frame advancement/withdrawal area. Automatic focus drive is thus carried out. However, since the cam ring 2 must be rotated for moving the counter-cam portion from the diaphragm resetting position to the setting position separated away from the resetting position, a long time is required for rotation. This leads to a long time lag. Besides, the time required for completing an automatic focus movement gets longer.

Figure 15:
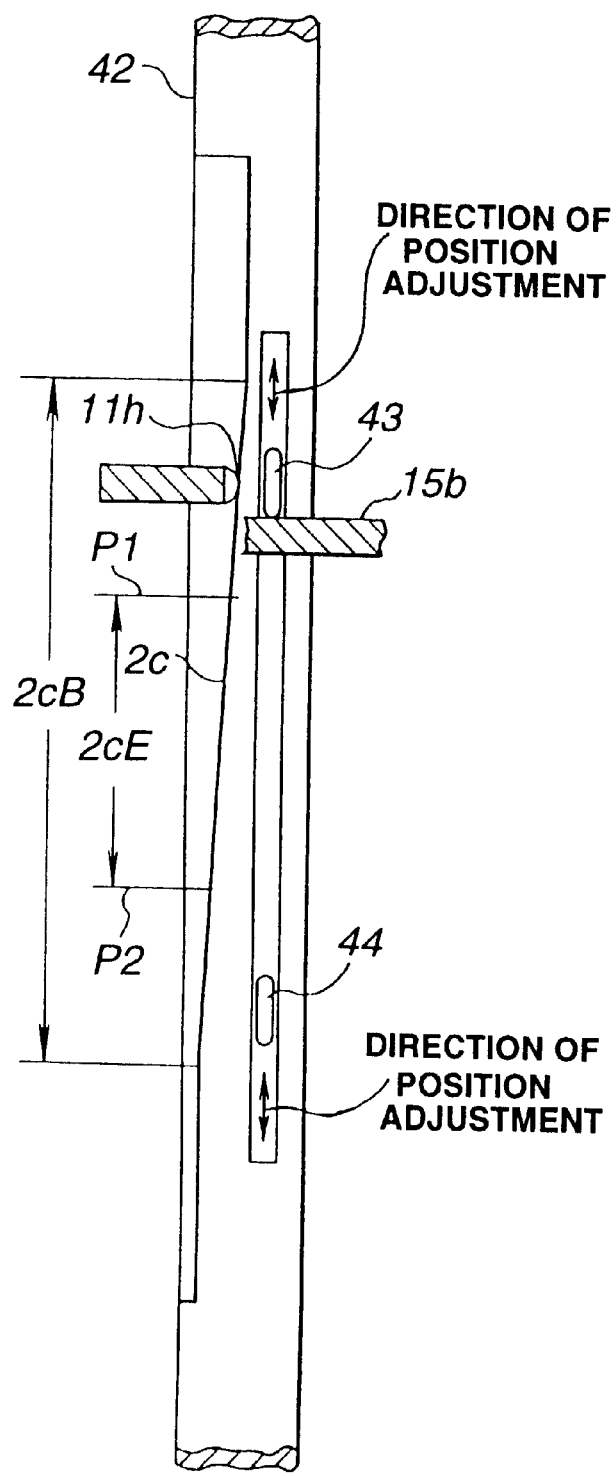
FIG. 15 shows the development of a cam ring in a variant of the photographic lens unit shown in FIG. 2.

A cam ring in this variant is intended to solve the above drawback. As seen from the development of a cam ring 42 in FIG. 15, the positions of a diaphragm resetting projection 43 and diaphragm setting projection 44 can be adjusted in the direction of rotation with respect to the lens frame advancement/withdrawal area 2cB of the cam portion 2c.

To be more specific, in an actual process of assembling and adjustment, the effective lens frame advancement/withdrawal area 2cE is defined within the lens frame advancement/withdrawal area 2cB on the basis of an advanced or withdrawn position or a position to which the lens frame 3 is advanced or withdrawn during an automatic focus movement. The positions of the diaphragm resetting projection 43 and diaphragm setting projection 44 are adjusted so that the diaphragm can be reset or set with the counter-cam portion located at a rotational position on the cam ring 3 that is as close as possible to the area 2cE.

By adopting the cam ring 42 that has the positions of the diaphragm resetting and setting projections thereof adjusted as mentioned above, the time required for completing setting of the diaphragm, the time required for completing an automatic focus movement, and the time required for completing resetting of the diaphragm can be shortened. A time lag can be reduced, and quick photography can be achieved. Moreover, the flange-focus distances of the photographic lenses can be adjusted. Furthermore, the magnitude of advancement or withdrawal of the lens frame can be limited and a space occupied by the lens frame can be limited.

Figure 16:
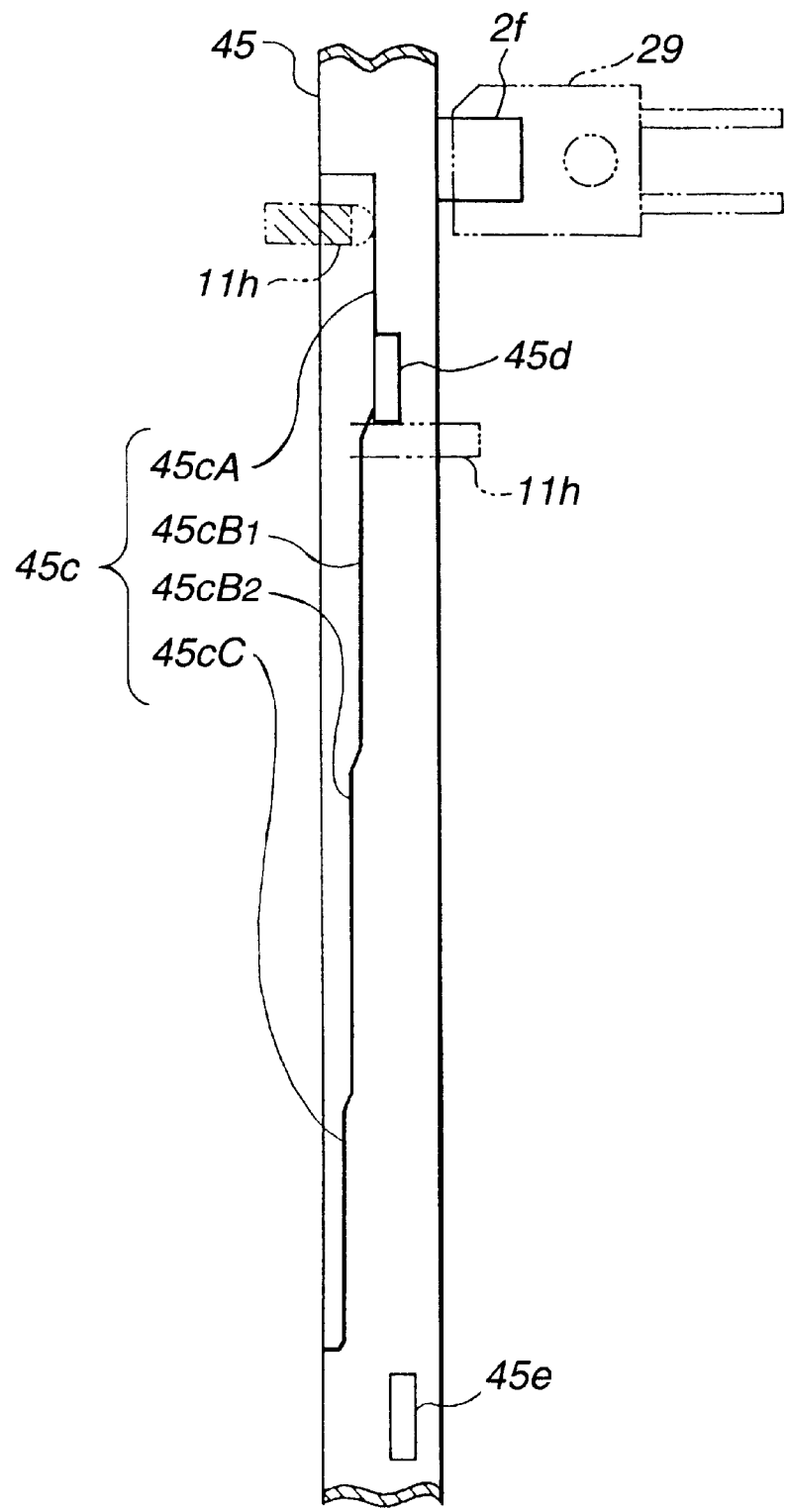
FIG. 16 shows the development of a cam ring in another variant of the photographic lens unit shown in FIG. 2.

Next, another variant of the photographic lens unit 101 shown in FIG. 12 and others in terms of the cam ring 2 will be described. A cam ring 45 in this variant is, as seen from the development shown in FIG. 16, a cam ring for a photographic lens unit adaptable to a camera capable of carrying out zone focusing. Specifically, a cam portion 45c has, like that of the cam ring 2, flat diaphragm resetting and setting areas 45cA and 45cC at both ends thereof, and two lens frame advancement/withdrawal areas 45cB1 and 45cB2, which constitute a stepped position restricting portion, in the center thereof. The areas 45cB1 and 45cB2 are used to focus the lenses on an infinite position and a very near position respectively.

Using the cam ring 45, even if a rotational position or a position on the cam ring 45 whose angle is changed in order to focus the lenses on an infinite position or very near position is deviated a little, the advanced or withdrawn position of the lens frame will not be deviated. The cam ring should merely be driven stepwise. Control of automatic focus drive can therefore be simplified.

In the cam ring 45 in the variant, the advancement/withdrawal area is provided as a two-step cam surface. Alternatively, a cam surface having three or more steps may be adopted. Furthermore, part of the stepped lens frame advancement/withdrawal area may be used for driving the photographic lenses for advancement or withdrawal for the purpose of macrophotography.

Figure 17:
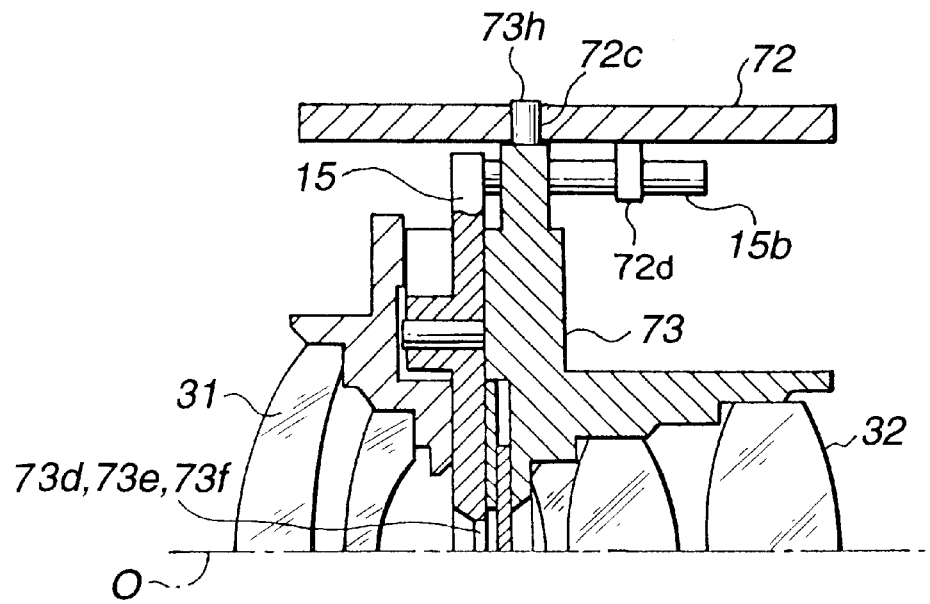
FIG. 17 is a longitudinal sectional view of a major portion of a photographic lens unit in which a cam cylinder is incorporated in place of the cam ring in the photographic lens unit shown in FIG. 2.
Figure 18:
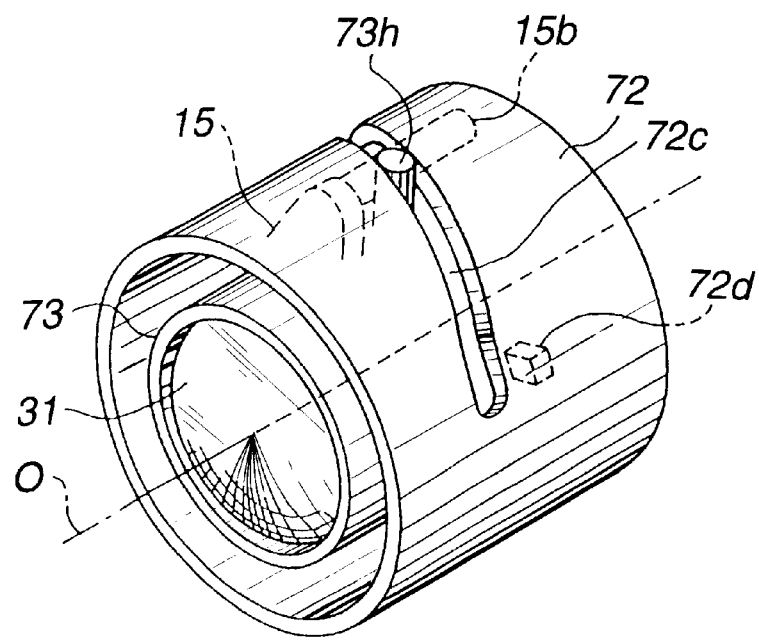
FIG. 18 is an oblique view of a major portion of the photographic lens unit shown in FIG. 17.

Next, a photographic lens unit adopting a cam cylinder in place of the cam ring 2 in the photographic lens unit 101 will be described in conjunction with FIGS. 17 and 18. FIG. 17 is a longitudinal sectional view showing a major portion of the photographic lens unit having the cam cylinder therein, and FIG. 18 is an oblique view showing the major portion of the photographic lens unit.

The cam cylinder 72 is shaped like a cylinder. A groove cam 72c used to drive a lens frame 73 for advancement or withdrawal by way of a cam follower 73h is formed on the outer circumference of the cam cylinder 72, and a diaphragm resetting projection 72d is formed on the inner circumference thereof. A diaphragm setting projection and a gear portion used to drive the cam cylinder are also included, though they are not illustrated.

A movement of driving the lens frame 73 for advancement or withdrawal and a movement of driving the diaphragm 15, which are made in the photographic lens unit of the variant having the cam cylinder 72, are identical to those made in the aforesaid embodiment. According to the photographic lens unit, the cam cylinder 72 can be stowed in the main unit readily. This contributes to an improvement of the efficiency in mounting.

Next, yet another variant of the photographic lens unit 101 in terms of the cam ring 2 will be described. A cam ring in this variant is such that a cam portion used to drive a strobe flashing unit so that the strobe flashing unit can pivot is formed outside the cam portion 2c used to drive the counter-cam portion 11h of the lens frame. By driving the strobe flashing unit so that the strobe flashing unit can pivot, the direction of the optical axis of the strobe flashing unit can be changed so that flashlight can be directed toward an object for macrophotography.

Figure 19:
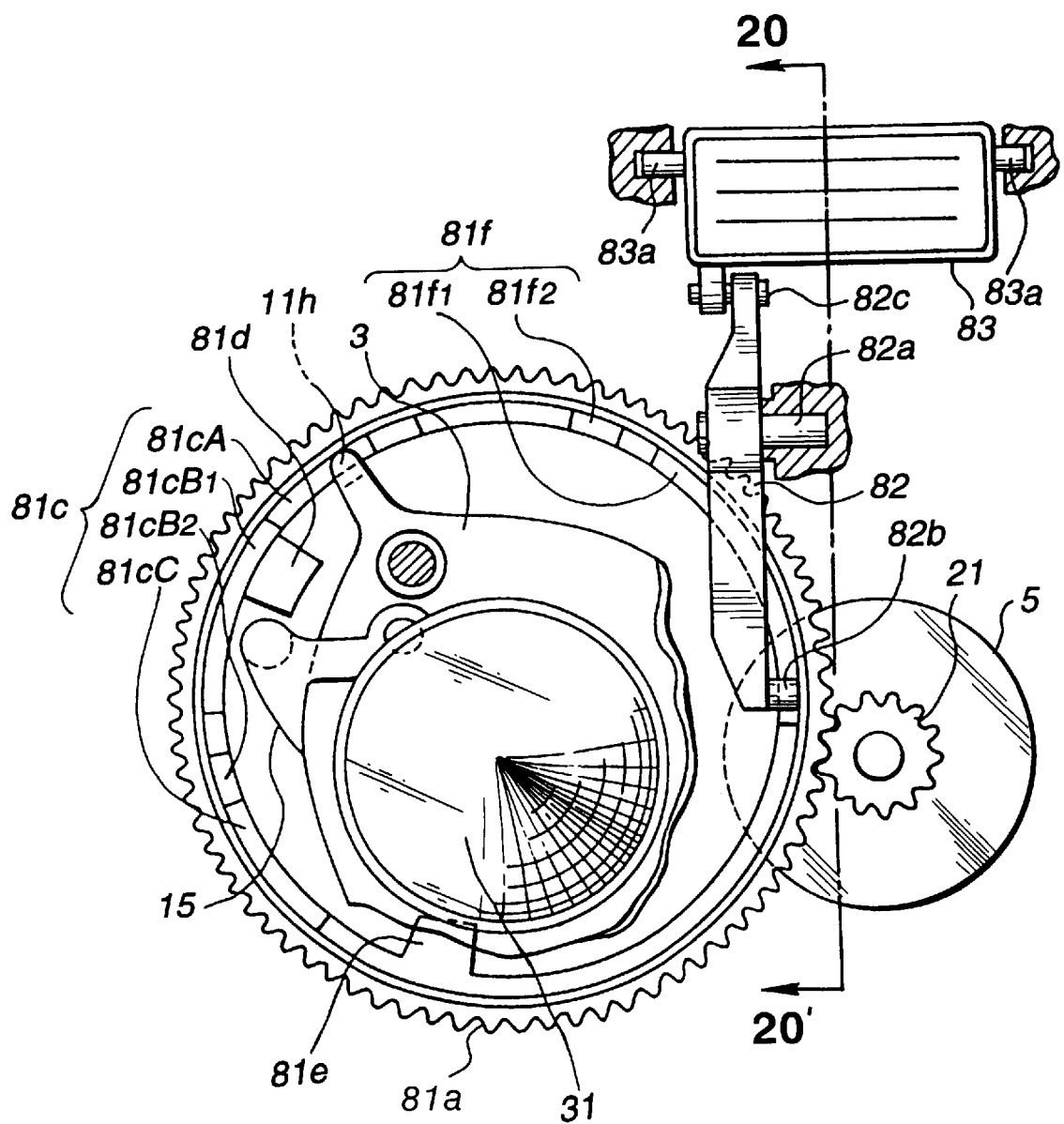
FIG. 19 is a sectional view showing a variant of the photographic lens unit shown in FIG. 2, in which a cam ring different from the one in the photographic lens unit shown in FIG. 2 is incorporated, and a strobe unit with both the units seen from an object side.
Figure 20:
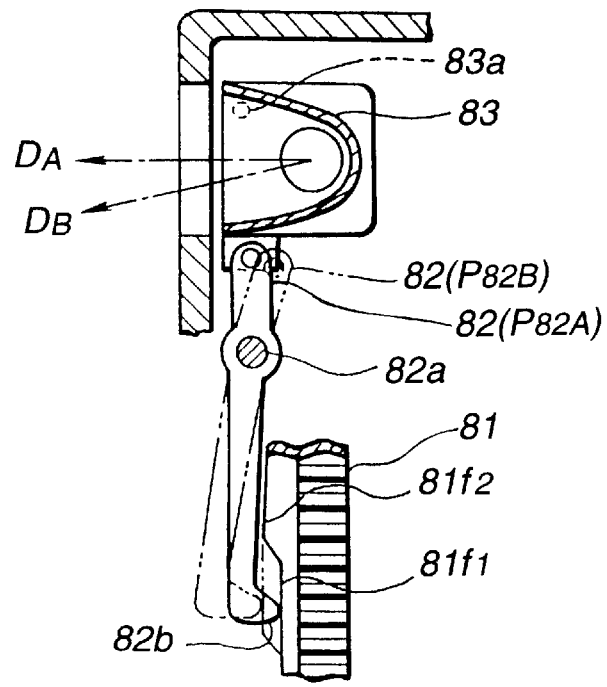
FIG. 20 is a 20–20' sectional view relevant to FIG. 19.

FIG. 19 is a sectional view of the photographic lens unit of the variant having a cam ring 81 therein and the strobe unit with the units seen from an object side. FIG. 20 is a 20–20' sectional view relevant to FIG. 19.

The cam ring 81 has, like the cam ring 2, a gear portion 81a for driving the cam ring formed on the outer circumference of the cam ring, a cam portion 81c abutting on the counter-cam portion 11h of the lens frame 3, serves as an automatic focus driving mechanism enabling automatic focus, and is a cam formed on a cylindrical end surface, a resetting projection 81d and setting projection 81e constituting a diaphragm driving mechanism capable of driving the diaphragm by abutting on the diaphragm plate 15, and a strobe driving cam portion 81f formed outside the area allocated to the cam portion 81c.

A strobe flashing unit 83 is supported by the main unit via support axes 83a. The strobe flashing unit 83 can driven to pivot with respect to a driving pin 82c of a strobe driving lever 82 which is supported by a support axis 82a so that the strobe driving lever can swivel freely.

The cam portion 81c of the cam ring 81 has flat areas 81cA and 81cB at opposite ends thereof, and a lens frame advancement/withdrawal area 81cB1 used for normal photography and a lens frame advancement/withdrawal macrophotography area 81cB2 used for macrophotography in the center thereof. The cam portion 81f has a flat area 81f1 symmetric to the lens frame advancement/withdrawal area 81cB1 and a strobe driving macrophotography area 81f2 symmetric to the lens frame advancement/withdrawal macrophotography area 81cB2 on each of which a counter-cam portion 82b of the strobe driving lever 82 can abut.

When the photographic lens unit of the variant having the cam ring of the above structure is used to carry out macrophotography, the cam ring 81 is rotated until the counter-cam portion 11h of the lens frame abuts on the lens frame advancement/withdrawal macrophotography area 81cB2. This causes the lens frame 3 to move to a macrophotographic state. At this time, the counter-cam portion 82b of the strobe driving lever 82 abuts on the macrophotography area 81f2 of the cam portion 81b. This causes the strobe flashing unit 83 to pivot. The direction of flashlight is therefore changed from a direction $D_A$ defined in the normal photographic state to a direction $D_B$ associated with macrophotography.

As mentioned above, according to the photographic lens unit of the variant adopting the cam ring 81, flashlight emanating from the strobe flashing unit for macrophotography can be changed to be directed downward, that is, toward a position very close to the optical axis O of the photographic lenses. Macrophotography can be carried out in an optimal light-distributed state.

In the photographic lens unit, the direction of flashlight emanating from the strobe unit is changed. Alternatively, the direction of the optical axis of a viewfinder which is variable may be changed along with the rotation of a cam ring in order to correct a parallax.

Figure 21:
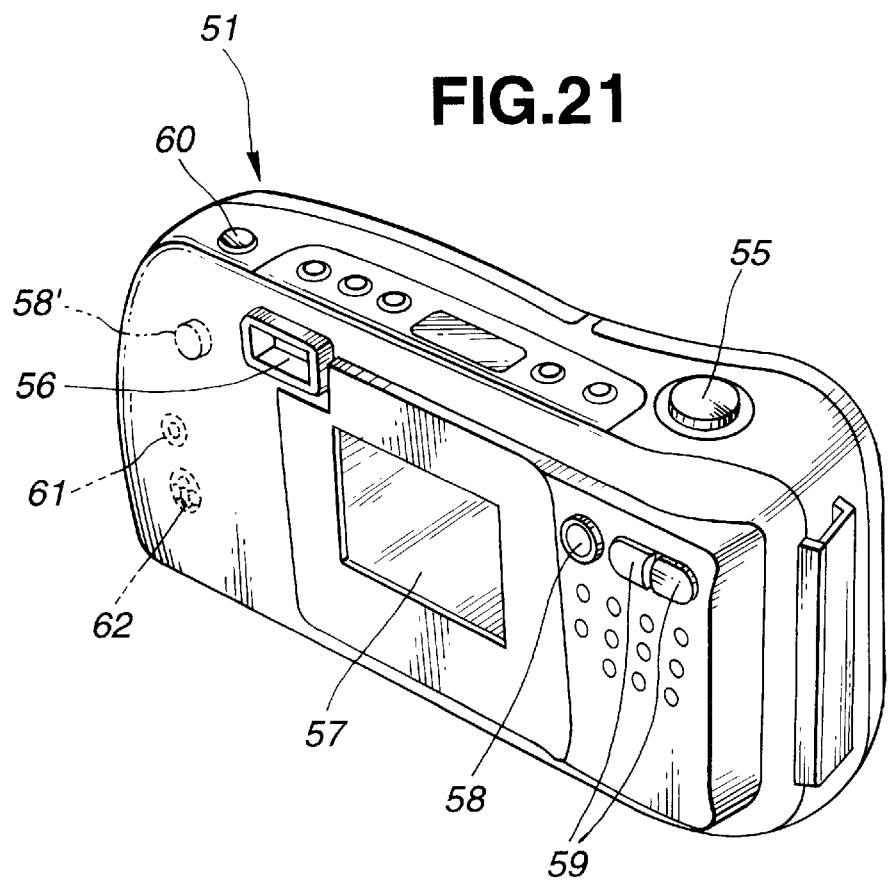
FIG. 21 is an oblique view showing the back appearance of the electronic still camera with a barrier shown in FIG. 1.
Figure 22:
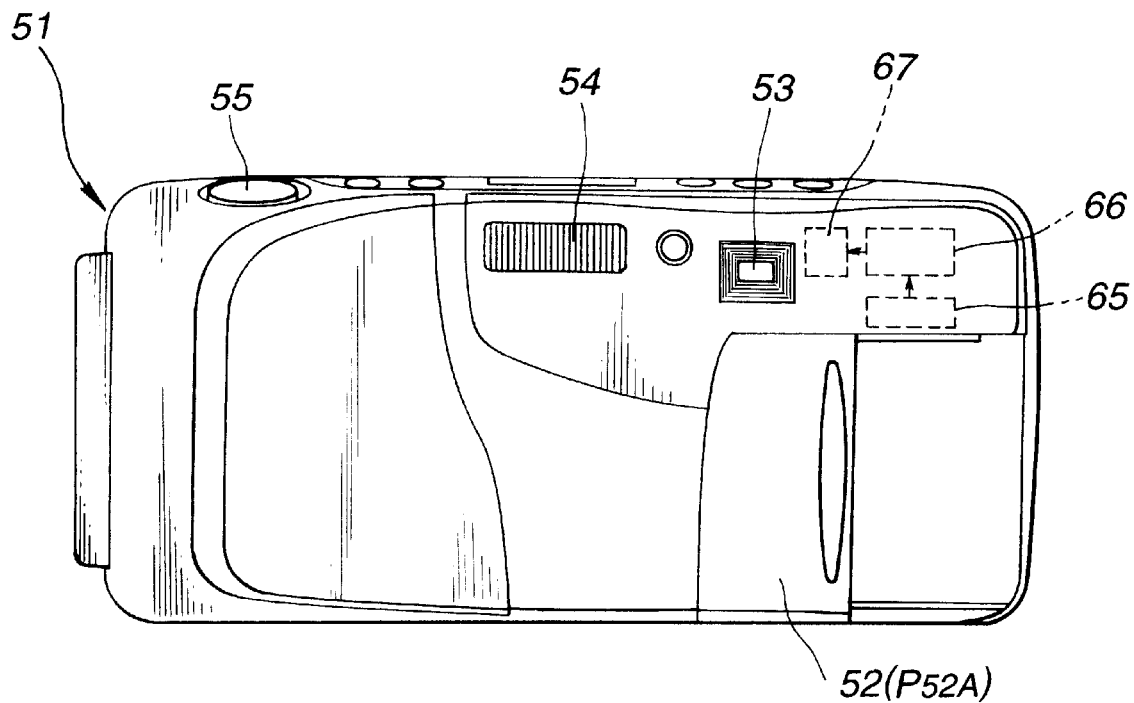
FIG. 22 is a front view of the camera shown in FIG. 21 of which barrier is closed.
Figure 23:
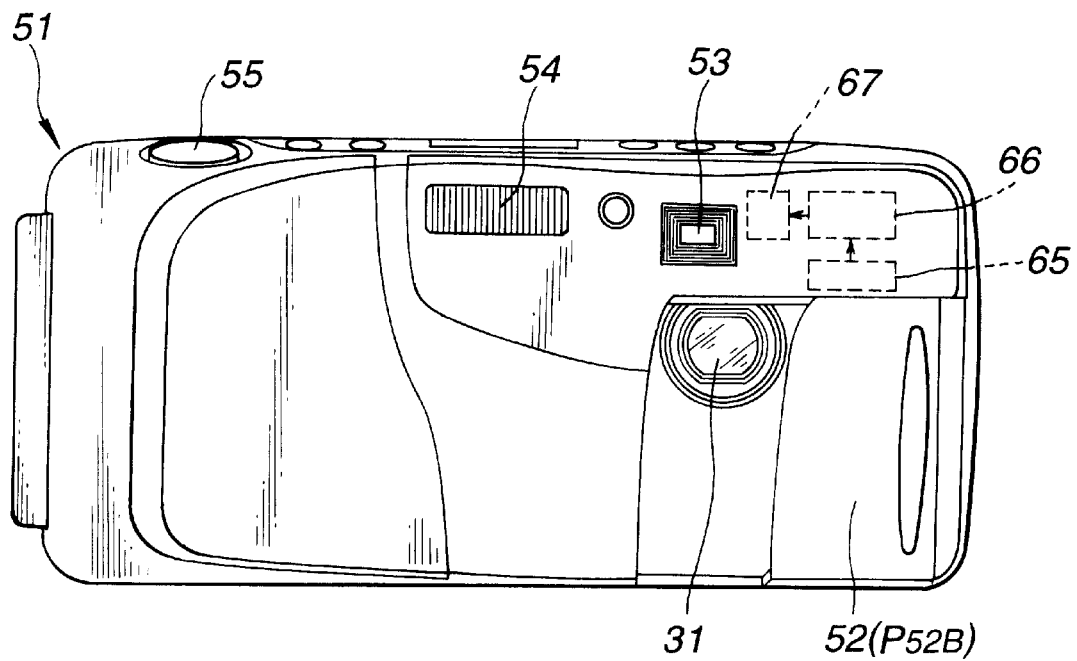
FIG. 23 is a front view of the camera shown in FIG. 21 of which barrier is open.

Next, the electronic still camera 51 with a barrier of this embodiment, in which the photographic lens unit 101 shown in FIG. 2 which has the components shown in FIG. 1 is incorporated, will be described. FIG. 21 is an oblique view showing the back appearance of the camera 51. FIGS. 22 and 23 are front views of the camera with the lens barrier 52 set to a closed state and open state respectively.

On the face of the camera 51, there is the barrier 52 movable to slide to a closed position P52A or open position P52B at which the photographic lens 31 is closed or open. Responsive to the opening or closing movement of the barrier, the barrier switch 65 incorporated in the camera is turned on or off. An output signal of the barrier switch 65 is input to the system controller 66 for controlling drive given by the motor or electromagnet. Also located on the face of the camera 51 are a viewfinder window 53 and a strobe window 54.

On the back of the camera 51, there are a viewfinder 56; the LCD monitor 57 for displaying a picked-up image that is a through picture produced by the CCD, a reproduced image of a projected image, or information of various characters; the LCD switch 58 located at a position, which permits a user to handle the LCD switch easily with the thumb of his/her right hand holding the camera, on the right hand of the LCD monitor 57; and a frame selection switch 59 used to select a frame to be reproduced during reproduction of an image.

On the top of the camera 51, there are a release switch 55 capable of being handled with the index finger of a hand holding the camera, a macrophotography switch 60 used to instruct macrophotography, and other operation switches. Moreover, an external power supply connector 61 via which another battery can be connected, and a communication connector 62 via which a personal computer or the like can be connected are located on the left-hand area on the back of the camera.

Since the external power supply connector 61 and communication connector 62 to which cables are plugged are located in the left-hand area on the back of the camera, even when the camera is held with a right hand with the cables plugged to the connectors, the cables will not interfere with the right hand.

Next, a photography/reproduction sequence to be carried out in the electronic still camera 51 with a barrier will be described using the flowchart of FIG. 24. When a battery is loaded, the sequence is started. At step S10, it is judged from an output signal of the barrier switch 65 whether or not the barrier is open. If the barrier is closed, control is passed to step S11. If the barrier is open, the photography mode in which data of a projected image is recorded in the memory 67 is selected. Control is then jumped to step S16.

At step S11, it is judged whether or not the LCD switch 58 is pressed. If the LCD switch is not pressed, control is returned to step S10. When the barrier 52 is closed, the LCD switch 58 is watched continuously. If the LCD switch 58 is pressed, the reproduction mode is identified, and the LCD monitor 57 is turned on (step S12).

In the reproduction mode, the LCD switch 58 acts electrically as a toggle switch. Even when the LCD switch 58 is released temporarily, the LCD monitor 57 remains on. A frame is then reproduced using a latest projected image (step S13). As long as the LCD switch 58 is on, frame reproduction is continued (step S14). A frame to be reproduced during reproduction can be selected using the frame selection switch 59.

When the LCD switch 58 is pressed again to be turned off, control is passed to step S15. The LCD monitor 57 is turned off, and the routine is terminated.

By contrast, when the photography mode is selected, control is jumped to step S16. In this case, first, the photographic lenses are reset. At step S17, an output of the barrier switch 65 is checked to see if the barrier is closed. If the barrier is closed, the routine is terminated. If the barrier is not closed, the state of the LCD switch 58 is checked (step S18).

If the LCD switch 58 is off, the LCD monitor 57 is turned off (step S23). Control is then passed to step S24. Thereafter, the press of the release switch 55 is awaited with the LCD monitor 57 off.

If the LCD switch 58 is found to be on, photography is carried out in a state in which the LCD monitor 57 functions as a viewfinder. Only when the LCD switch 58 is pressed, the LCD monitor 57 works as a viewfinder, that is, displays an object image. When the LCD switch 58 is released, the LCD monitor 57 is turned off. The LCD switch 58 is therefore located at a position permitting a user to handle the switch easily with the thumb of his/her right hand holding the camera. By thus handling the LCD switch, the LCD monitor 57 requiring relatively large power can remain off when it is unnecessary. Thus, power saving can be achieved successfully.

Thereafter, control is passed to step S19. The cam ring 2 is rotated for moving the photographic lenses to a pan focusing position. Photometry is carried out, and a CCD shutter is adjusted (steps S20 and S21). A through image picked up by the CCD is displayed on the LCD monitor 57 (step S22). At step S24, it is awaited that the release switch 55 is pressed.

The cam ring is rotated responsive to the press of the release switch 55. The lens frame 3 is driven to an in-focus position, and photometry is carried out (steps S25 and S26). The cam ring 2 is further rotated for driving the diaphragm, and the lens frame 3 is then driven to the in-focus position (steps S27 and S28). Thereafter, the shutter is driven for carrying out exposure (step S29). After the diaphragm is reset (step S30), control is returned to step S16. If it is detected that the barrier is closed, the routine is terminated.

Since the camera 51 may be held with a left hand, an LCD switch 58' may be located on the left hand of the LCD monitor 57. In this case, the release switch 55 can be handled with the index finger of a right hand while the LCD switch 58' is pressed with the thumb of a left hand.

Figure 24:
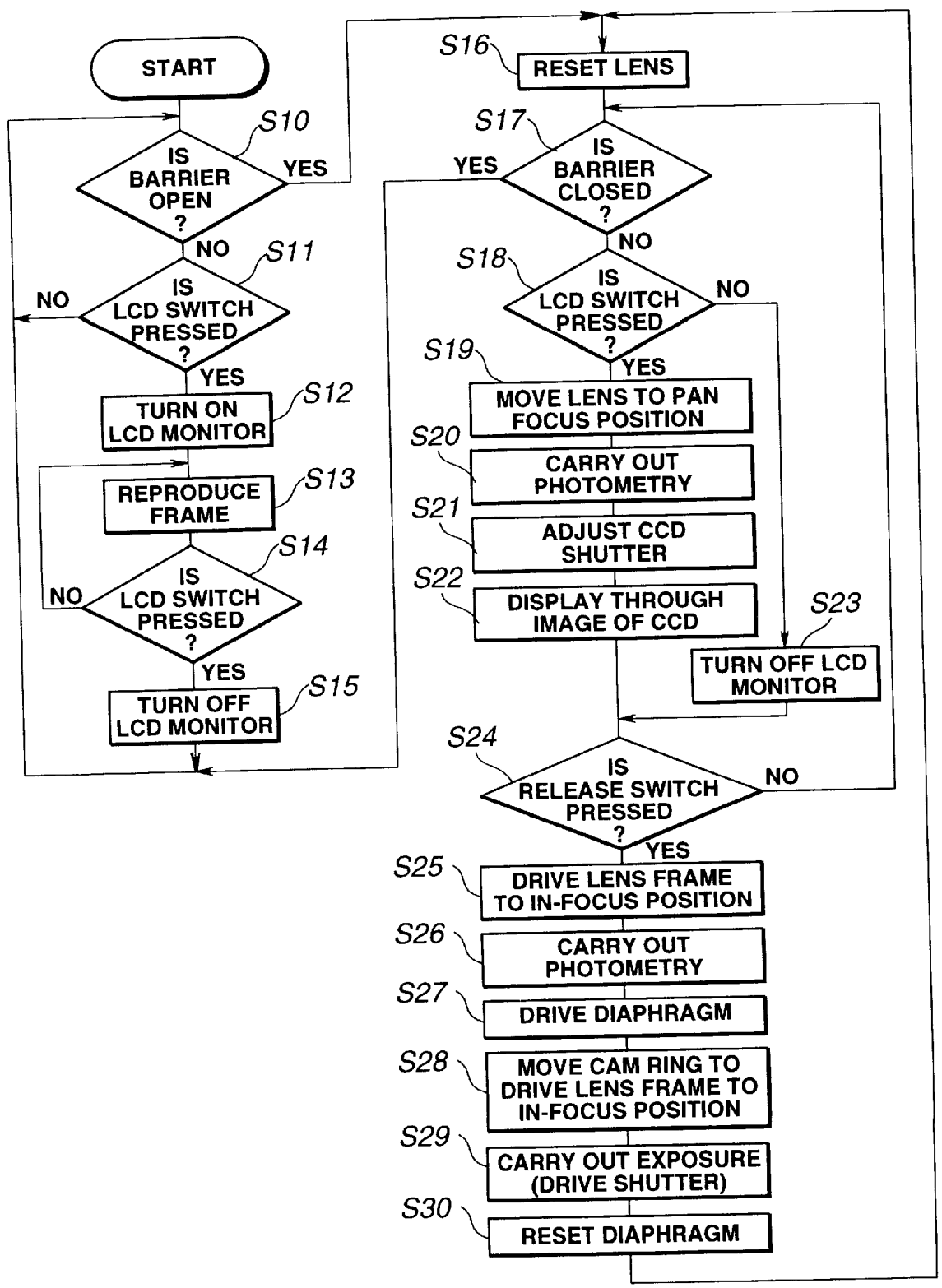
FIG. 24 is a flowchart describing a photography/reproduction sequence to be carried out in the electronic still camera with a barrier shown in FIG. 1.
Figure 25:
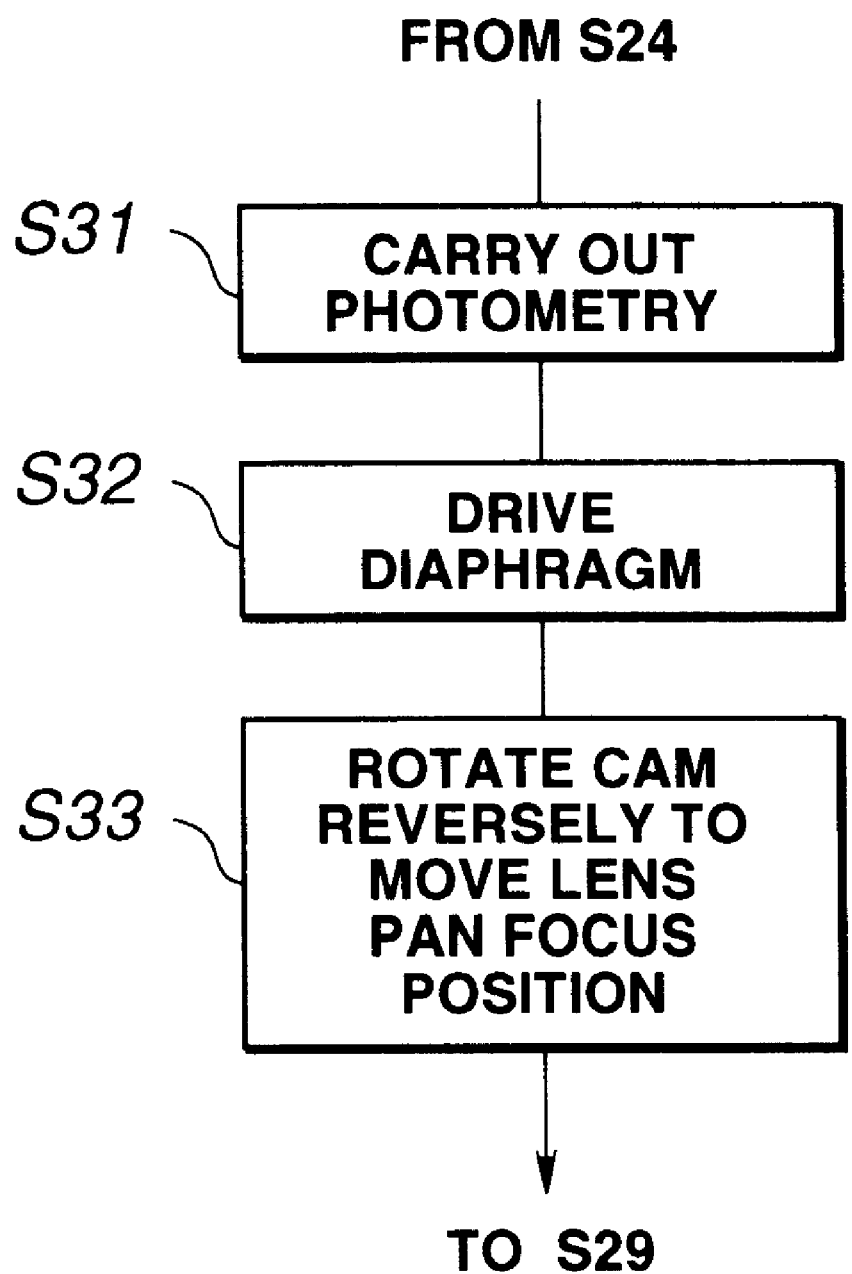
FIG. 25 describes part of a photography sequence to be carried out in a manual focusing type camera that is a variant of the camera shown in FIG. 24.

Moreover, if the camera is a manual focusing type electronic still camera, photography is carried out by running a routine in which steps S25 to S28 of the photography sequence described in the flowchart of FIG. 24 are replaced with steps S31 to S33 described in the flowchart of FIG. 25.

As described so far, in the electronic still camera 51 with a barrier of this embodiment, an output of the barrier switch 65 interlocked with the barrier 52 is used to detect if the barrier 52 is open or closed. If the barrier 52 is open, the photography mode is selected. If the barrier 52 is closed, when the LCD switch 58 is turned on, the reproduction mode is automatically selected. By switching the LCD switch, the LCD monitor 57 can be switched smoothly from the reproduction mode to the photography mode or vice versa.

In the camera 51, unlike a conventional electronic still camera, a switch dedicated to switching of the photography mode and reproduction mode need not be included. This is advantageous in terms of both an arrangement space and cost. Moreover, since the lens barrier opening movement is made for photography without fail, the photography mode is selected spontaneously. A user is therefore not be bothered himself/herself by handling a dedicated mode selection switch. Moreover, such an incident that a user presses the release button while viewing a reproduced picture despite the reproduction mode will hardly take place.

Moreover, since the dedicated mode selection switch is unnecessary, the space use efficiency and cost-efficiency are good.

As a variant of the camera 51, a proposal can be made for a camera in which when the photography mode or reproduction mode is selected by handling the LCD switch 58, whether a through picture produced by the CCD is displayed on the LCD monitor 57 or a reproduced picture represented by image data stored in the memory 67 is displayed thereon can be designated.

What is claimed is:

1. A method for operating an electronic imaging apparatus having a photographing lens, means for electrically converting an object image formed by said photographing lens, a display, a memory for storing an image, a lens barrier movable between a closed position covering said photographing lens and an open position uncovering said photographing lens, said method comprising:

(a) determining the position of said lens barrier;

(b) enabling said display, when said barrier is in said closed position, for displaying an image stored in said memory; and (c) preventing the operation of said means for converting an object image when said barrier is in said closed position; and said apparatus including a display switch movable between a first position for turning on said display and a second position for turning off said display, and wherein step (b) further comprises:

(d) enabling said display when said display switch is in said first position and said barrier means is in the closed position.

2. A method for operating an electronic imaging apparatus having a photographing lens, means for electrically converting an object image formed by said photographing lens, a display, a memory for storing an image, a lens barrier movable between a closed position covering said photographing lens and an open position uncovering said photographing lens, said method comprising:

(a) determining the position of said lens barrier;

(b) enabling said means for electrically converting an object image when said barrier is in said open position for capturing an image formed by said photographing lens; and (c) preventing the memory from transferring an image to said display when said barrier is in said open position; and said apparatus including a display switch movable between a first position for turning on said display and a second position for turning off said display, and further comprising:

(d) enabling said display to display the image converted by said means for electrically converting an object image when said display switch is in said first position and said barrier means is in the open position.

3. An electronic imaging apparatus comprising:

a photographing lens, means for electrically converting an object image formed by said photographing lens, a memory for storing images;

a display, a lens barrier movable between a closed position covering said photographing lens and an open position uncovering said photographing lens, a controller for enabling said means for electrically converting an object image, when said barrier is in said open position, to convert an object image formed by said photographing lens and preventing said memory from transferring an image to said display; and a display switch, said controller enabling an image from said means for converting an image to be displayed by said display means when said display switch is in an on position and said lens barrier is open whereby an image formed by said photographing lens may viewed by an operator.

4. The apparatus of claim 3 wherein said display is an LCD display, whereby power is conserved when said display switch is in an off position to turn off said display.

* * * * *